US012709183B2

(12) United States Patent
Miller

(10) Patent No.: US 12,709,183 B2
(45) Date of Patent: Aug. 18, 2026

(54) REFUSE VEHICLE WITH DISPLAY OF IMPLEMENT OPERATION AND STATE OF CHARGE

(71) Applicant: Oshkosh Corporation, Oshkosh, WI (US)

(72) Inventor: Amanda Miller, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 120 days.

(21) Appl. No.: 18/443,464

(22) Filed: Feb. 16, 2024

(65) Prior Publication Data

US 2024/0278685 A1 Aug. 22, 2024

Related U.S. Application Data

(60) Provisional application No. 63/446,471, filed on Feb. 17, 2023.

(51) Int. Cl.

*B60L 58/12* (2019.01)
*B60L 50/61* (2019.01)
*B65F 3/02* (2006.01)
*B65F 3/04* (2006.01)
*B65F 3/06* (2006.01)
*B65F 3/14* (2006.01)

(52) U.S. Cl.

CPC .............. *B60L 58/12* (2019.02); *B65F 3/048* (2013.01); *B65F 3/06* (2013.01); *B60L 50/61* (2019.02); *B60L 2200/36* (2013.01); *B60L 2250/16* (2013.01); *B60L 2250/30* (2013.01); *B65F 2003/0266* (2013.01); *B65F 2003/146* (2013.01)

(58) Field of Classification Search

None

See application file for complete search history.

(56) References Cited

U.S. PATENT DOCUMENTS

2004/0002794 A1 1/2004 Pillar et al.
2005/0113996 A1 5/2005 Pillar et al.
2005/0234622 A1 10/2005 Pillar et al.
2008/0114513 A1 5/2008 Pillar et al.
2012/0025765 A1* 2/2012 Frey ...................... B60L 3/0069 320/109

(Continued)

OTHER PUBLICATIONS https://info.macktrucks.com/refuse-revolution; "Welcome to the refuse revolution. Mack LR Electric." Retrieved on Mar. 21, 2023.

(Continued)

*Primary Examiner* — Brian P Sweeney
*Assistant Examiner* — Jonathan E Reinert
(74) *Attorney, Agent, or Firm* — Foley & Lardner LLP

(57) ABSTRACT

A refuse vehicle can include a battery, a display device, a door, and a control system. The batter can power the refuse vehicle. The display device can display one or more user interfaces. The control system can include one or more memory devices. The one or more memory devices can store instructions that can cause, when executed by one or more processors, the one or more processors to determine a state of charge of the battery, detect that the door has moved from a first position to a second position, and transmit a control signal to the display device causing the display device to display a user interface including the state of charge of the battery.

12 Claims, 23 Drawing Sheets

(56) References Cited

U.S. PATENT DOCUMENTS

| | | | | |
|---|---|---|---|---|
| 2013/0274972 | A1* | 10/2013 | Kusumi | B60W 50/085 701/22 |
| 2015/0210313 | A1 | 7/2015 | Sears et al. | |
| 2017/0259798 | A1* | 9/2017 | Toole | B60T 13/14 |
| 2019/0325220 | A1* | 10/2019 | Wildgrube | G06V 20/58 |
| 2021/0121340 | A1 | 4/2021 | Malcolm et al. | |
| 2021/0276423 | A1 | 9/2021 | Lombardo et al. | |
| 2021/0276847 | A1 | 9/2021 | Neubauer et al. | |
| 2021/0276848 | A1 | 9/2021 | Miller et al. | |
| 2021/0369515 | A1 | 12/2021 | Malcolm et al. | |
| 2022/0000686 | A1 | 1/2022 | Malcolm et al. | |
| 2022/0009338 | A1* | 1/2022 | Yakes | B60K 6/46 |
| 2022/0135385 | A1 | 5/2022 | Lombardo et al. | |
| 2022/0204332 | A1 | 6/2022 | Miller et al. | |
| 2022/0211560 | A1 | 7/2022 | Malcolm et al. | |
| 2022/0234873 | A1 | 7/2022 | Miller et al. | |

OTHER PUBLICATIONS https://www.youtube.com/watch?v=NQFtAnm7D-c; “All-New Mack LR Electric Garbage Truck.” Retrieved on Mar. 21, 2023.

* cited by examiner

1800

REFUSE VEHICLE WITH DISPLAY OF IMPLEMENT OPERATION AND STATE OF CHARGE

CROSS-REFERENCE TO RELATED PATENT APPLICATIONS

This application claims the benefit of and priority to U.S. Provisional Patent Application No. 63/446,471, filed on Feb. 17, 2023, the entirety of which is incorporated by reference herein.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One embodiment relates to a refuse vehicle. The refuse vehicle can include a battery. The battery can power the refuse vehicle. The refuse vehicle can also include a display device. The display device can display one or more user interfaces. The refuse vehicle can also include a door. The refuse vehicle can also include a control system. The control system can include one or more memory devices. The one or more memory devices can store instructions. The instructions, when executed by one or more processors, can cause the one or more processors to determine a state of charge of the battery. The instructions can also cause the one or more processors to detect that the door has moved from a first position to a second position. The instructions can also cause the one or more processors to transmit, responsive to detecting that the door has moved from the first position to the second position, a control signal to the display device causing the display device to display a user interface including the state of charge of the battery. The display device can display the user interface for a predetermined amount of time.

In some embodiments, the instructions can also cause the one or more processors to determine that the battery is electrically coupled with a power source. The instructions can also cause the one or more processors to transmit, responsive to detecting that the battery is electrically coupled with the power source, a second control signal to the display device causing the display device to update the user interface to include an indication that the battery is charging.

In some embodiments, the display device can be disposed within a center console of the refuse vehicle.

In some embodiments, the user interface can include an indication that the refuse vehicle is electrically coupled with a power source, and a prompt to decouple the refuse vehicle from the power source prior to operation of the refuse vehicle.

In some embodiments, the instructions can also cause the one or more processors to determine that the refuse vehicle is in a first operation status. The instructions can also cause the one or more processors to transmit, based on the first operation status and responsive to detecting that the door has moved from the first position to the second position, the control signal to the display device.

In some embodiments, the refuse vehicle can also include a sensor and an implement. The instructions can also cause the one or more processors to receive, from the sensor, a set operational data associated with the refuse vehicle. The instructions can also cause the one or more processors to determine, using the set of operational data, that the refuse vehicle is operating in a first mode. The instructions can also cause the one or more processors to transmit, responsive to determining that the refuse vehicle is operating in the first mode, a second control signal to the display device causing the display device to update the user interface to include a first view of the refuse vehicle. The instructions can also cause the one or more processors to transmit, responsive to determining that the refuse vehicle is operating in the first mode, a third control signal to the implement, wherein the third control signal prevents operation of the implement.

In some embodiments, the instructions can also cause the one or processors to receive, from the sensor, a second set of operational data associated with the refuse vehicle. The instructions can also cause the one or more processors to determine, using the second set of operational data, that the refuse vehicle is operating in a second mode. The instructions can also cause the one or more processors to transmit, responsive to determining that the refuse vehicle is operating in the second mode; a fourth control signal to the display device causing the display device to update the user interface to include a second view of the refuse vehicle. The first view of the refuse vehicle and the second view of the refuse vehicle can be different.

In some embodiments, the instructions can also cause the one or more processors to determine that that refuse vehicle is operating in a second mode. The instructions can also cause the one or more processors to transmit, responsive to determining that the refuse vehicle is operating in the second mode, a fourth control signal to the implement, wherein the third control signal enables operation of the implement.

In some embodiments, the refuse vehicle can include a sensor and an audio device. The instructions can also cause the one or more processors to receive, from the sensor, a set of operational data associated with operation of the refuse vehicle. The instructions can also cause the one or more processors to determine, using the set of operation data and a predetermined set of operational data, a difference that indicates a deviation in operation of the refuse vehicle. The instructions can also cause the one or more processors to transmit, responsive to determination of the difference, a second control signal to the audio device causing the audio device to produce an audible alert to indication the deviation in the operation of the refuse vehicle.

In some embodiments, the refuse vehicle can include a climate system. The climate system can control an environmental condition of the refuse vehicle. The refuse vehicle can also include a steering wheel. The steering wheel can include an input device. The input device can be associated with an aspect of the environmental condition of the refuse vehicle. The instructions can also cause the one or more processors to detect a first interaction with the input device, the first interaction indicating a value pertaining to the aspect of the environmental condition of the refuse vehicle. The instructions can also cause the one or more processors to transmit, responsive to detecting the first interaction, a second control signal to the climate system causing the climate system to control the environmental condition of the refuse vehicle to reflect the value pertaining to the aspect of the environmental condition of the refuse vehicle.

In some embodiments, the refuse vehicle can include an implement. The implement can perform an action associated with operation of the refuse vehicle. The refuse vehicle can also include a steering wheel. The steering wheel can include an input device. The input device can pertain to an aspect of the action associated with the operation of the refuse vehicle. The instructions can also cause the one or more processors to detect a first interaction with the input device, the first interaction indicating a request to perform the action associated with the operation of the refuse vehicle. The instructions can also cause the one or more processors to transmit, responsive to detecting the first interaction, a second control signal to the implement causing the implement to perform the action associated with the operation of the refuse vehicle.

In some embodiments, the refuse vehicle can include a brake system. The refuse vehicle can also include an input device. The input device can activate, responsive to a first interaction with the input device, the brake system. The input device can also deactivate, responsive to a second interaction with the input device, the brake system.

In some embodiments, the input device can include at least one of a button or a switch.

One embodiment relates to a refuse vehicle. The refuse vehicle can include a display device. The display device can display one or more user interfaces. The refuse vehicle can also include a sensor, an implement, and a control system. The control system can include one or more memory devices. The one or more memory devices can store instructions. The instructions, when executed by one or more processors, can cause the one or more processors to receive, from the sensor, a set operational data associated with the refuse vehicle. The instructions can also cause the one or more processors to determine, using the set of operational data, that the refuse vehicle is operating in a first mode. The instructions can also cause the one or more processors to transmit, responsive to determining that the refuse vehicle is operating in the first mode, a first control signal to the display device causing the display device to display a user interface that includes a first view of the refuse vehicle. The instructions can also cause the one or more processors to transmit, responsive to determining that the refuse vehicle is operating in the first mode, a second control signal to the implement. The second control signal can prevent operation of the implement.

In some embodiments, the instructions can also cause the one or more processors to receive, from the sensor, a second set of operational data associated with the refuse vehicle. The instructions can also cause the one or more processors to determine, using the second set of operational data, that the refuse vehicle is operating in a second mode. The instructions can also cause the one or more processors to transmit, responsive to determining that the refuse vehicle is operating in the second mode; a third control signal to the display device causing the display device to update the user interface to include a second view of the refuse vehicle. The first view of the refuse vehicle and the second view of the refuse vehicle can be different.

In some embodiments, the refuse vehicle can include a battery. The batter can power the refuse vehicle. The refuse vehicle can also include a door. The instructions can also cause the one or more processors to determine a state of charge of the battery. The instructions can also cause the one or more processors to detect that the door has moved from a first position to a second position. The instructions can also cause the one or more processors to transmit, responsive to detecting that the door has moved from the first position to the second position, a third control signal to the display device causing the display device to update the user interface to include the state of charge of the battery. The display device can display the user interface for a predetermined amount of time.

In some embodiment, the instructions can also cause the one or more processors to determine that the battery is electrically coupled with a power source. The instructions can also cause the one or more processors to transmit, responsive to detecting that the battery is electrically coupled with the power source, a fourth control signal to the display device causing the display device to update the user interface to include an indication that the battery is charging.

One embodiment relates to a refuse vehicle. The refuse vehicle can include a sensor, an audio device, a climate system, a steering wheel, and a control system. The climate system can control an environmental condition of the refuse vehicle. The steering wheel can include an input device. The input device can be associated with an aspect of the environmental condition of the refuse vehicle. The control system can include one or more memory devices. The one or more memory devices can store instructions. The instructions, when executed by one or more processors, can cause the one or more processors to receive, from the sensor, a set of operational data associated with operation of the refuse vehicle. The instructions can also cause the one or more processors to determine, using the set of operation data and a predetermined set of operational data, a difference that indicates a deviation in operation of the refuse vehicle. The instructions can also cause the one or more processors to transmit, responsive to determination of the difference, a control signal to the audio device causing the audio device to produce an audible alert to indication the deviation in the operation of the refuse vehicle. The instructions can also cause the one or more processors to detect a first interaction with the input device, the first interaction indicating a value pertaining to the aspect of the environmental condition of the refuse vehicle. The instructions can also cause the one or more processors to transmit, responsive to detecting the first interaction, a second control signal to the climate system causing the climate system to control the environmental condition of the refuse vehicle to reflect the value pertaining to the aspect of the environmental condition of the refuse vehicle.

In some embodiments, the refuse vehicle can also include an implement. The implement can perform an action associated with operation of the refuse vehicle. The input device can pertain to an aspect of the action associated with the operation of the refuse vehicle. The instructions can also cause the one or more processors to detect a second interaction with the input device. The second interaction can indicate a request to perform the action associated with the operation of the refuse vehicle. The instructions can also cause the one or more processors to transmit, responsive to detecting the second interaction, a third control signal to the implement causing the implement to perform the action associated with the operation of the refuse vehicle.

In some embodiments, the refuse vehicle can also include an implement. The instructions can also cause the one or more processors to receive, from the sensor, a second set operational data associated with the refuse vehicle. The instructions can also cause the one or more processors to determine, using the second set of operational data, that the refuse vehicle is operating in a first mode. The instructions can also cause the one or more processors to transmit, responsive to determining that the refuse vehicle is operating in the first mode, a third control signal to a display device causing the display device to update the user interface to include a first view of the refuse vehicle. The instructions can also cause the one or more processors to transmit, responsive to determining that the refuse vehicle is operating in the first mode, a fourth control signal to the implement, wherein the fourth control signal prevents operation of the implement.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle (e.g., a refuse vehicle, etc.) of the present disclosure includes a chassis, a cab coupled to the chassis, a body assembly coupled to the chassis and positioned rearward of the cab, a plurality of rear axle assemblies coupled to the chassis, and a plurality of fenders coupled to the body assembly (rather than being coupled to the chassis) and positioned proximate the plurality of rear axle assemblies. Such a fender arrangement provides various advantages. For example, benefits of mounting to the body assembly include reduced mounting bracket weight since such a mounting arrangement provides a more direct load path. As another example, finding frame or chassis "real estate" for fender mounting brackets can be difficult when a vehicle platform has multiple different wheelbase variants.

Overall Vehicle

Figure 1:
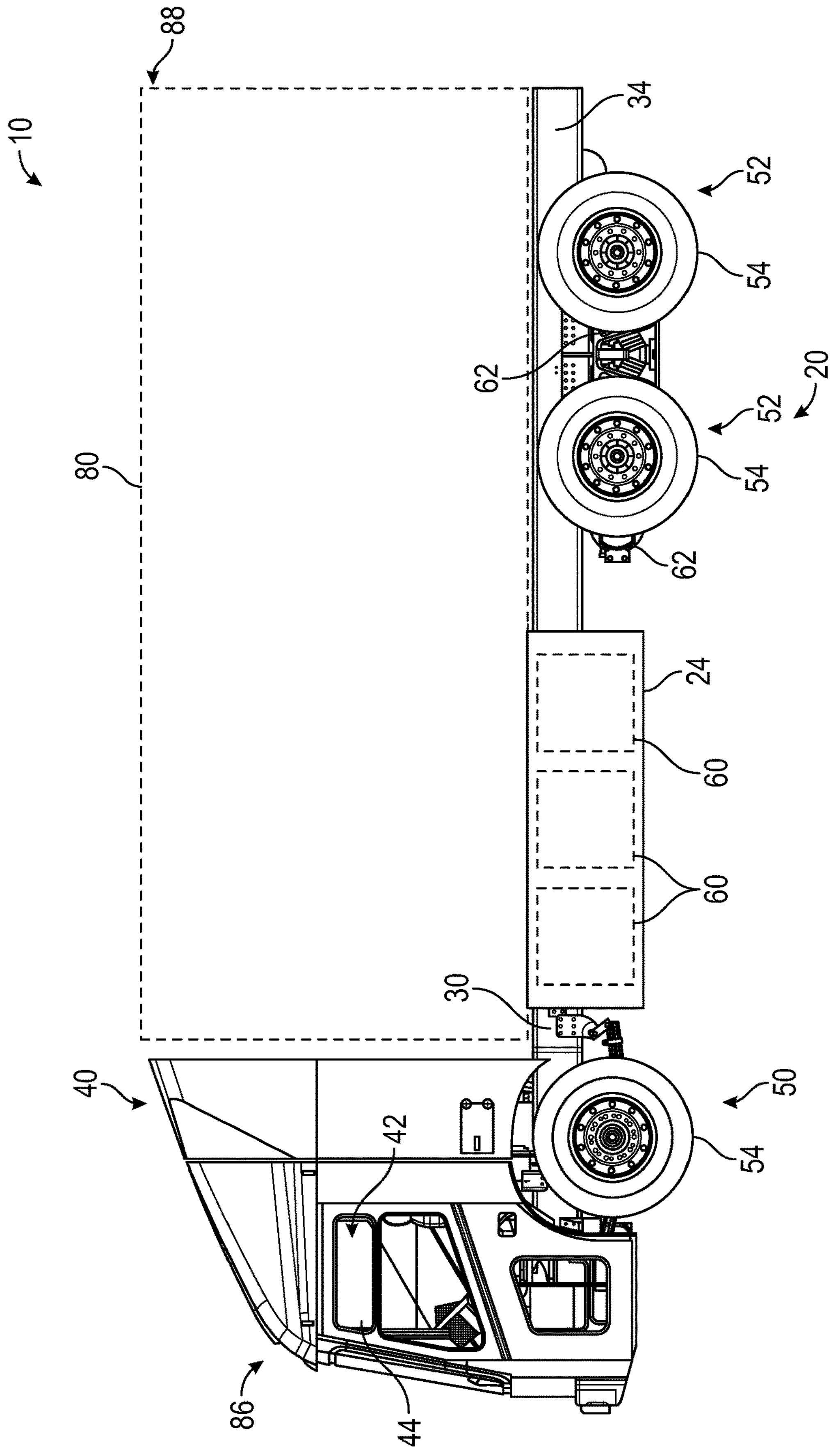
FIG. 1 is a left side view of a vehicle, according to an exemplary embodiment.
Figure 2:
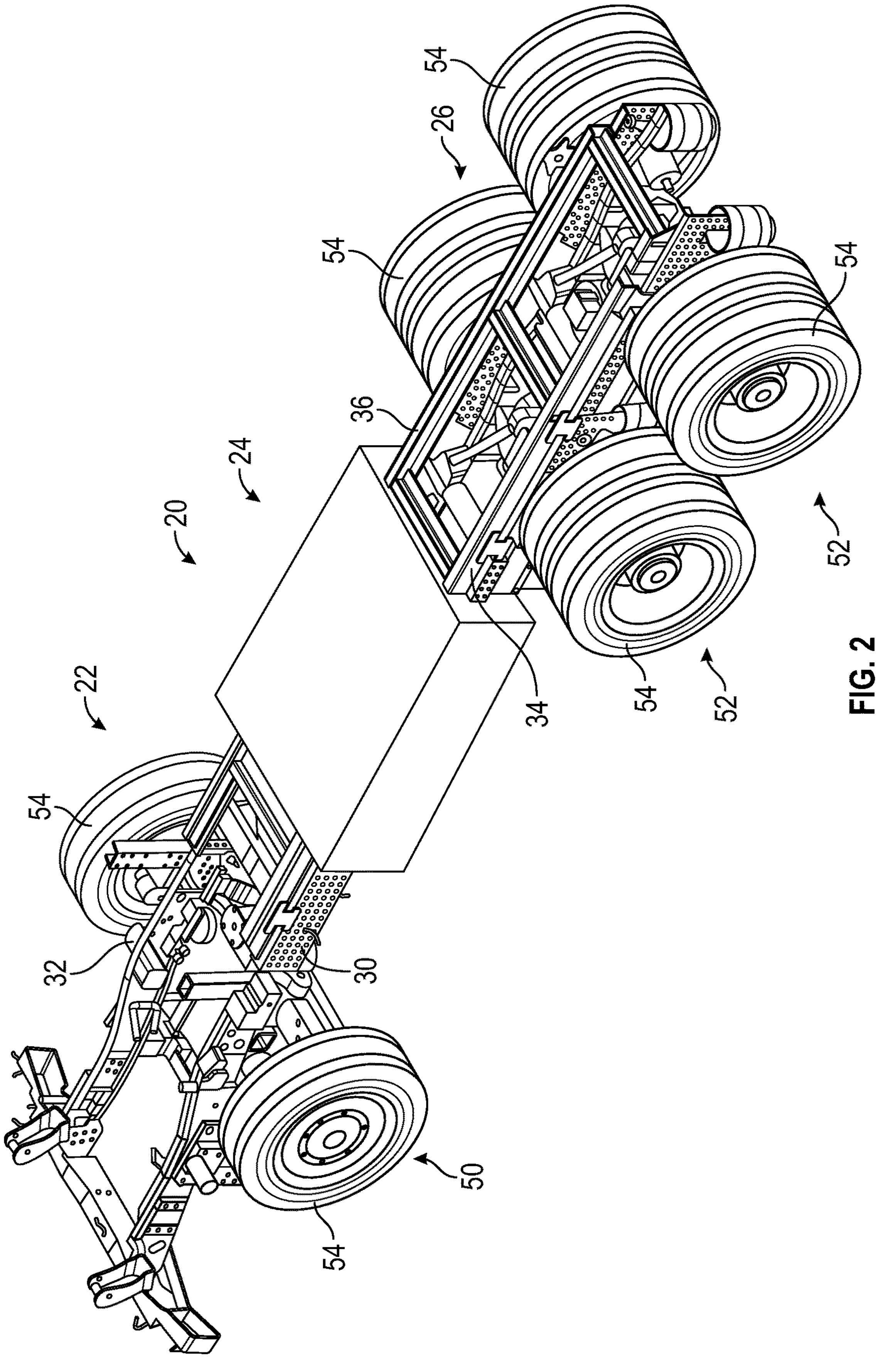
FIG. 2 is a perspective view of a chassis of the vehicle of FIG. 1.

Referring to FIGS. 1 and 2, a reconfigurable vehicle (e.g., a vehicle assembly, a truck, a vehicle base, etc.) is shown as vehicle 10, according to an exemplary embodiment. As shown, the vehicle 10 includes a frame assembly or chassis assembly, shown as chassis 20, that supports other components of the vehicle 10. The chassis 20 extends longitudinally along a length of the vehicle 10, substantially parallel to a primary direction of travel of the vehicle 10. As shown, the chassis 20 includes three sections or portions, shown as front section 22, middle section 24, and rear section 26. The middle section 24 of the chassis 20 extends between the front section 22 and the rear section 26. In some embodiments, the middle section 24 of the chassis 20 couples the front section 22 to the rear section 26. In other embodiments, the front section 22 is coupled to the rear section 26 by another component (e.g., the body of the vehicle 10).

As shown in FIG. 2, the front section 22 includes a pair of frame portions, frame members, or frame rails, shown as front rail portion 30 and front rail portion 32. The rear section 26 includes a pair of frame portions, frame members, or frame rails, shown as rear rail portion 34 and rear rail portion 36. The front rail portion 30 is laterally offset from the front rail portion 32. Similarly, the rear rail portion 34 is laterally offset from the rear rail portion 36. This spacing may provide frame stiffness and space for vehicle components (e.g., batteries, motors, axles, gears, etc.) between the frame rails. In some embodiments, the front rail portions 30 and 32 and the rear rail portions 34 and 36 extend longitudinally and substantially parallel to one another. The chassis 20 may include additional structural elements (e.g., cross members that extend between and couple the frame rails).

In some embodiments, the front section 22 and the rear section 26 are configured as separate, discrete subframes (e.g., a front subframe and a rear subframe). In such embodiments, the front rail portion 30, the front rail portion 32, the rear rail portion 34, and the rear rail portion 36 are separate, discrete frame rails that are spaced apart from one another. In some embodiments, the front section 22 and the rear section 26 are each directly coupled to the middle section 24 such that the middle section 24 couples the front section 22 to the rear section 26. Accordingly, the middle section 24 may include a structural housing or frame. In other embodiments, the front section 22, the middle section 24, and the rear section 26 are coupled to one another by another component, such as a body of the vehicle 10.

In other embodiments, the front section 22, the middle section 24, and the rear section 26 are defined by a pair of frame rails that extend continuously along the entire length of the vehicle 10. In such an embodiment, the front rail portion 30 and the rear rail portion 34 would be front and rear portions of a first frame rail, and the front rail portion 32 and the rear rail portion 36 would be front and rear portions of a second frame rail. In such embodiments, the middle section 24 would include a center portion of each frame rail.

In some embodiments, the middle section 24 acts as a storage portion that includes one or more vehicle components. The middle section 24 may include an enclosure that contains one or more vehicle components and/or a frame that supports one or more vehicle components. By way of example, the middle section 24 may contain or include one or more electrical energy storage devices (e.g., batteries, capacitors, etc.). By way of another example, the middle section 24 may include fuel tanks. By way of yet another example, the middle section 24 may define a void space or storage volume that can be filled by a user.

A cabin, operator compartment, or body component, shown as cab 40, is coupled to a front end portion of the chassis 20 (e.g., the front section 22 of the chassis 20). Together, the chassis 20 and the cab 40 define a front end of the vehicle 10. The cab 40 extends above the chassis 20. The cab 40 includes an enclosure or main body that defines an interior volume, shown as cab interior 42, that is sized to contain one or more operators. The cab 40 also includes one or more doors 44 that facilitate selective access to the cab interior 42 from outside of the vehicle 10. The cab interior 42 contains one or more components that facilitate operation of the vehicle 10 by the operator. By way of example, the cab interior 42 may contain components that facilitate operator comfort (e.g., seats, seatbelts, etc.), user interface components that receive inputs from the operators (e.g., steering wheels, pedals, touch screens, switches, buttons, levers, etc.), and/or user interface components that provide information to the operators (e.g., lights, gauges, speakers, etc.). The user interface components within the cab 40 may facilitate operator control over the drive components of the vehicle 10 and/or over any implements of the vehicle 10.

The vehicle 10 further includes a series of axle assemblies, shown as front axle 50 and rear axles 52. As shown, the vehicle 10 includes one front axle 50 coupled to the front section 22 of the chassis 20 and two rear axles 52 each coupled to the rear section 26 of the chassis 20. In other embodiments, the vehicle 10 includes more or fewer axles. By way of example, the vehicle 10 may include a tag axle that may be raised or lowered to accommodate variations in weight being carried by the vehicle 10. The front axle 50 and the rear axles 52 each include a series of tractive elements (e.g., wheels, treads, etc.), shown as wheel and tire assemblies 54. The wheel and tire assemblies 54 are configured to engage a support surface (e.g., roads, the ground, etc.) to support and propel the vehicle 10. The front axle 50 and the rear axles 52 may include steering components (e.g., steering arms, steering actuators, etc.), suspension components (e.g., gas springs, dampeners, air springs, etc.), power transmission or drive components (e.g., differentials, drive shafts, etc.), braking components (e.g., brake actuators, brake pads, brake discs, brake drums, etc.), and/or other components that facilitate propulsion or support of the vehicle.

In some embodiments, the vehicle 10 is configured as an electric vehicle that is propelled by an electric powertrain system. Referring to FIG. 1, the vehicle 10 includes one or more electrical energy storage devices (e.g., batteries, capacitors, etc.), shown as batteries 60. As shown, the batteries 60 are positioned within the middle section 24 of the chassis 20. In other embodiments, the batteries 60 are otherwise positioned throughout the vehicle 10. The vehicle 10 further includes one or more electromagnetic devices or prime movers (e.g., motor/generators), shown as drive motors 62. The drive motors 62 are electrically coupled to the batteries 60. The drive motors 62 may be configured to receive electrical energy from the batteries 60 and provide rotational mechanical energy to the wheel and tire assemblies 54 to propel the vehicle 10. The drive motors 62 may be configured to receive rotational mechanical energy from the wheel and tire assemblies 64 and provide electrical energy to the batteries 60, providing a braking force to slow the vehicle 10.

The batteries 60 may include one or more rechargeable batteries (e.g., lithium-ion batteries, nickel-metal hydride batteries, lithium-ion polymer batteries, lead-acid batteries, nickel-cadmium batteries, etc.). The batteries 60 may be charged by one or more sources of electrical energy onboard the vehicle 10 (e.g., solar panels, etc.) or separate from the vehicle 10 (e.g., connections to an electrical power grid, a wireless charging system, etc.). As shown, the drive motors 62 are positioned within the rear axles 52 (e.g., as part of a combined axle and motor assembly). In other embodiments, the drive motors 62 are otherwise positioned within the vehicle 10.

In other embodiments, the vehicle 10 is configured as a hybrid vehicle that is propelled by a hybrid powertrain system (e.g., a diesel/electric hybrid, gasoline/electric hybrid, natural gas/electric hybrid, etc.). According to an exemplary embodiment, the hybrid powertrain system may include a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may combust fuel (e.g., gasoline, diesel, etc.) to provide mechanical energy, which a transmission may receive and provide to the front axle 50 and/or the rear axles 52 to propel the vehicle 10. Additionally or alternatively, the primary driver may provide mechanical energy to the generator, which converts the mechanical energy into electrical energy. The electrical energy may be stored in the energy storage device (e.g., the batteries 60) in order to later be provided to a motive driver.

In yet other embodiments, the chassis 20 may further be configured to support non-hybrid powertrains. For example, the powertrain system may include a primary driver that is a compression-ignition internal combustion engine that utilizes diesel fuel.

Referring to FIG. 1, the vehicle 10 includes a rear assembly, module, implement, body, or cargo area, shown as application kit 80. The application kit 80 may include one or more implements, vehicle bodies, and/or other components. Although the application kit 80 is shown positioned behind the cab 40, in other embodiments the application kit 80 extends forward of the cab 40. The vehicle 10 may be outfitted with a variety of different application kits 80 to configure the vehicle 10 for use in different applications. Accordingly, a common vehicle 10 can be configured for a variety of different uses simply by selecting an appropriate application kit 80. By way of example, the vehicle 10 may be configured as a refuse vehicle, a concrete mixer, a fire fighting vehicle, an airport fire fighting vehicle, a lift device (e.g., a boom lift, a scissor lift, a telehandler, a vertical lift, etc.), a crane, a tow truck, a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle. FIGS. 3-13 illustrate various examples of how the vehicle 10 may be configured for specific applications. Although only a certain set of vehicle configurations is shown, it should be understood that the vehicle 10 may be configured for use in other applications that are not shown.

The application kit 80 may include various actuators to facilitate certain functions of the vehicle 10. By way of example, the application kit 80 may include hydraulic actuators (e.g., hydraulic cylinders, hydraulic motors, etc.), pneumatic actuators (e.g., pneumatic cylinders, pneumatic motors, etc.), and/or electrical actuators (e.g., electric motors, electric linear actuators, etc.). The application kit 80 may include components that facilitate operation of and/or control of these actuators. By way of example, the application kit 80 may include hydraulic or pneumatic components that form a hydraulic or pneumatic circuit (e.g., conduits, valves, pumps, compressors, gauges, reservoirs, accumulators, etc.). By way of another example, the application kit 80 may include electrical components (e.g., batteries, capacitors, voltage regulators, motor controllers, etc.). The actuators may be powered by components of the vehicle 10. By way of example, the actuators may be powered by the batteries 60, the drive motors 62, or the primary driver (e.g., through a power take off).

The vehicle 10 generally extends longitudinally from a front side 86 to a rear side 88. The front side 86 is defined by the cab 40 and/or the chassis. The rear side 88 is defined by the application kit 80 and/or the chassis 20. The primary, forward direction of travel of the vehicle 10 is longitudinal, with the front side 86 being arranged forward of the rear side 88.

Front-Loading Refuse Vehicle

Figure 3:
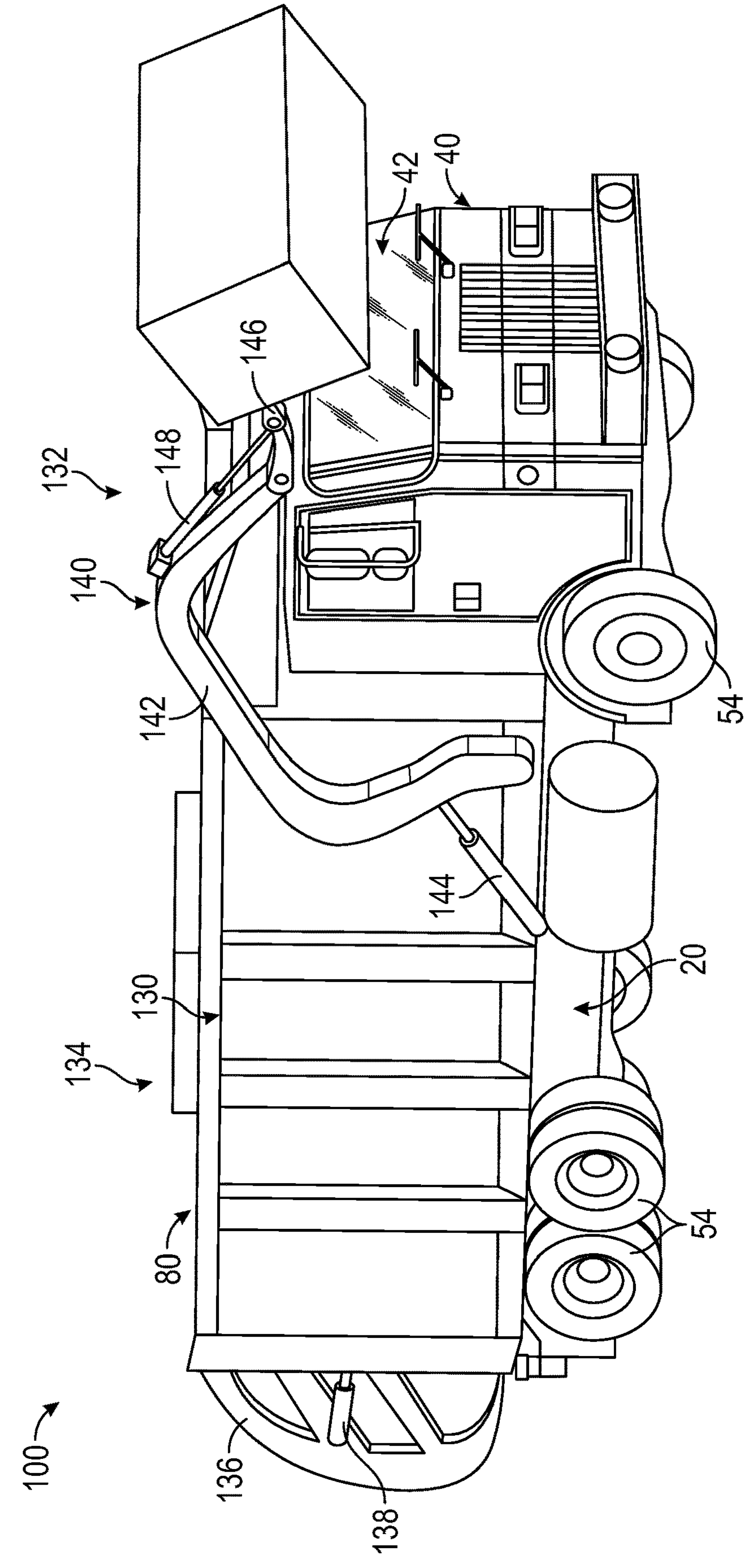
FIG. 3 is a perspective view of the vehicle of FIG. 1 configured as a front-loading refuse vehicle, according to an exemplary embodiment.
Figure 4:
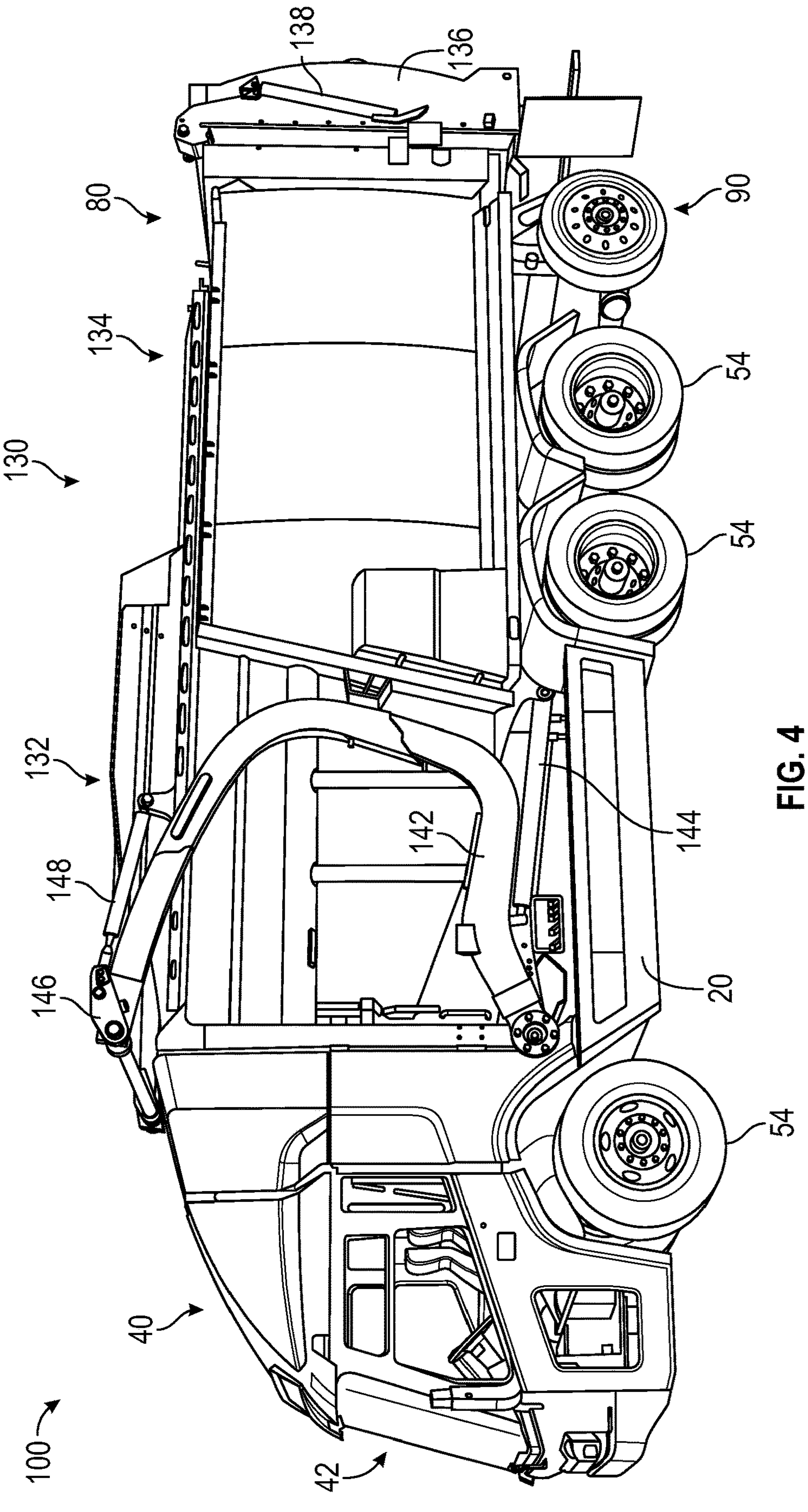
FIG. 4 is a left side view of the front-loading refuse vehicle of FIG. 3 configured with a tag axle.
Figure 5:
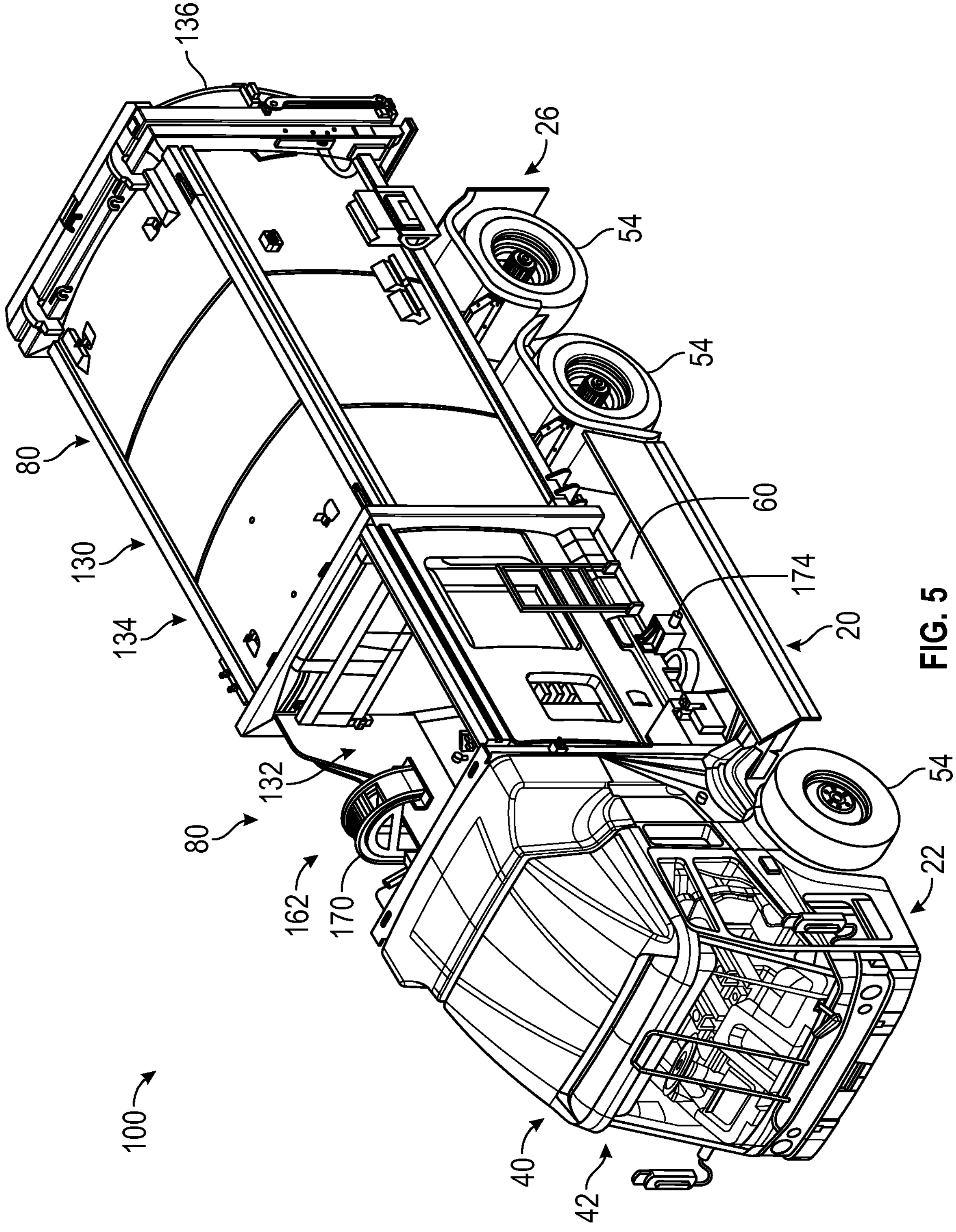
FIG. 5 is a perspective view of the vehicle of FIG. 1 configured as a side-loading refuse vehicle, according to an exemplary embodiment.
Figure 6:
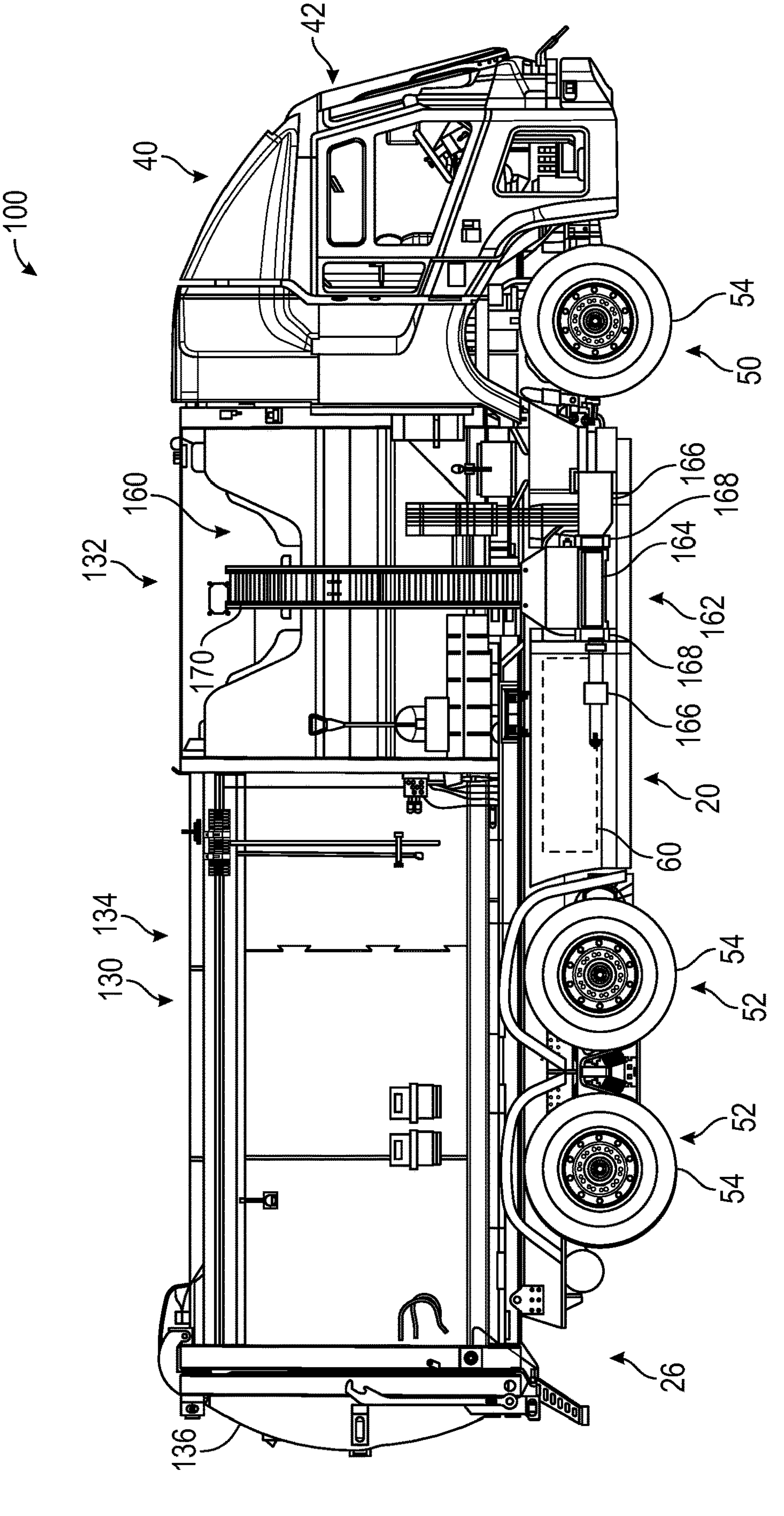
FIG. 6 is a right side view of the side-loading refuse vehicle of FIG. 5.
Figure 7:
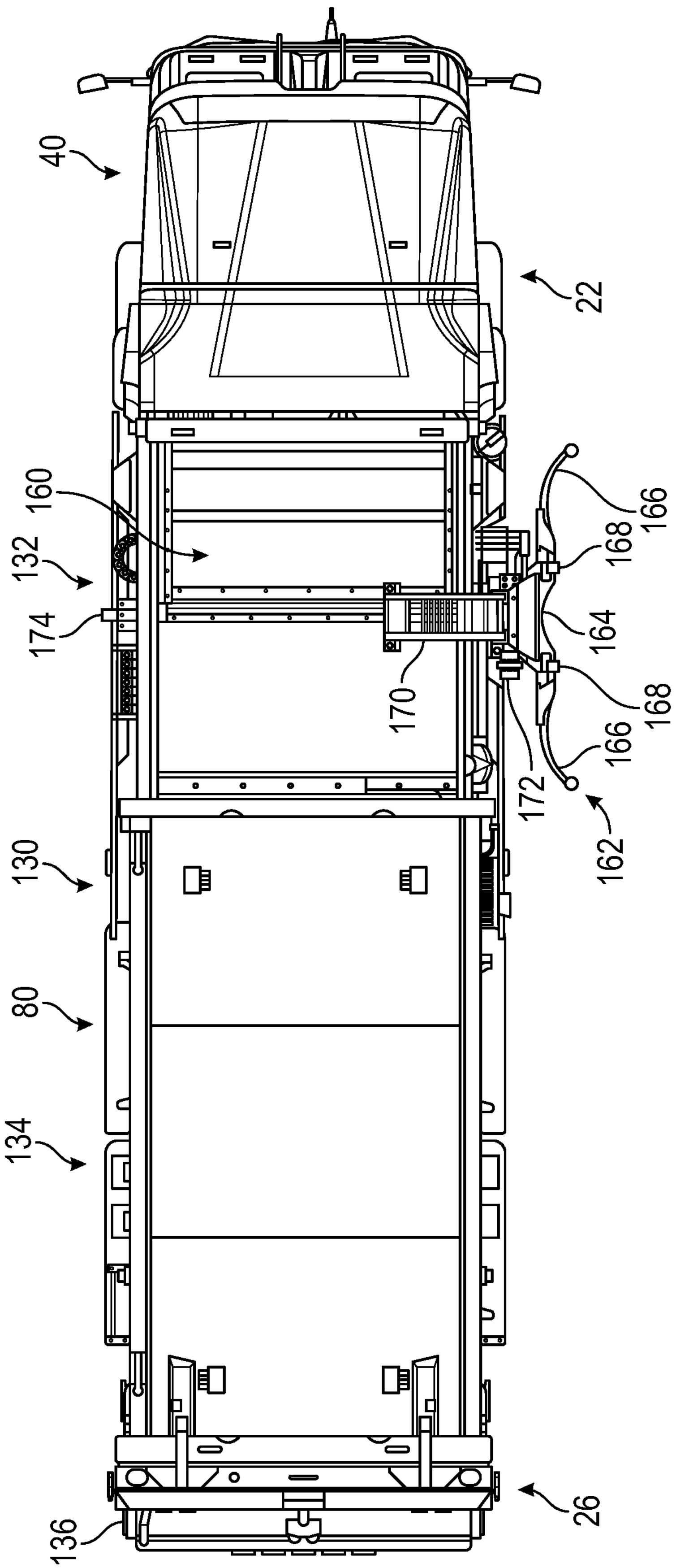
FIG. 7 is a top view of the side-loading refuse vehicle of FIG. 5.

Referring now to FIGS. 3 and 4, the vehicle 10 is configured as a refuse vehicle 100 (e.g., a refuse truck, a garbage truck, a waste collection truck, a sanitation truck, a recycling truck, etc.). Specifically, the refuse vehicle 100 is a front-loading refuse vehicle. In other embodiments, the refuse vehicle 100 is configured as a rear-loading refuse vehicle or a front-loading refuse vehicle. The refuse vehicle 100 may be configured to transport refuse from various waste receptacles (e.g., refuse containers) within a municipality to a storage and/or processing facility (e.g., a landfill, an incineration facility, a recycling facility, etc.).

FIG. 4 illustrates the refuse vehicle 100 of FIG. 3 configured with a liftable axle, shown as tag axle 90, including a pair of wheel and tire assemblies 54. As shown, the tag axle 90 is positioned reward of the rear axles 52. The tag axle 90 can be selectively raised and lowered (e.g., by a hydraulic actuator) to selectively engage the wheel and tire assemblies 54 of the tag axle 90 with the ground. The tag axle 90 may be raised to reduce rolling resistance experienced by the refuse vehicle 100. The tag axle 90 may be lowered to distribute the loaded weight of the vehicle 100 across a greater number of a wheel and tire assemblies 54 (e.g., when the refuse vehicle 100 is loaded with refuse).

As shown in FIGS. 3 and 4, the application kit 80 of the refuse vehicle 100 includes a series of panels that form a rear body or container, shown as refuse compartment 130. The refuse compartment 130 may facilitate transporting refuse from various waste receptacles within a municipality to a storage and/or a processing facility (e.g., a landfill, an incineration facility, a recycling facility, etc.). By way of example, loose refuse may be placed into the refuse compartment 130 where it may be compacted (e.g., by a packer system within the refuse compartment 130). The refuse compartment 130 may also provide temporary storage for refuse during transport to a waste disposal site and/or a recycling facility. In some embodiments, the refuse compartment 130 may define a hopper volume 132 and storage volume 134. In this regard, refuse may be initially loaded into the hopper volume 132 and later compacted into the storage volume 134. As shown, the hopper volume 132 is positioned between the storage volume 134 and the cab 40 (e.g., refuse is loaded into a portion of the refuse compartment 130 behind the cab 40 and stored in a portion further toward the rear of the refuse compartment 130). In other embodiments, the storage volume may be positioned between the hopper volume and the cab 40 (e.g., in a rear-loading refuse truck, etc.). The application kit 80 of the refuse vehicle 100 further includes a pivotable rear portion, shown as tailgate 136, that is pivotally coupled to the refuse compartment 130. The tailgate 136 may be selectively repositionable between a closed position and an open position by an actuator (e.g., a hydraulic cylinder, an electric linear actuator, etc.), shown as tailgate actuator 138 (e.g., to facilitate emptying the storage volume).

As shown in FIGS. 3 and 4, the refuse vehicle 100 also includes an implement, shown as lift assembly 140, which is a front-loading lift assembly. According to an exemplary embodiment, the lift assembly 140 includes a pair of lift arms 142 and a pair of actuators (e.g., hydraulic cylinders, electric linear actuators, etc.), shown as lift arm actuators 144. The lift arms 142 may be rotatably coupled to the chassis 20 and/or the refuse compartment 130 on each side of the refuse vehicle 100 (e.g., through a pivot, a lug, a shaft, etc.), such that the lift assembly 140 may extend forward relative to the cab 40 (e.g., a front-loading refuse truck, etc.). In other embodiments, the lift assembly 140 may extend rearward relative to the application kit 80 (e.g., a rear-loading refuse truck). As shown in FIGS. 3 and 4, in an exemplary embodiment the lift arm actuators 144 may be positioned such that extension and retraction of the lift arm actuators 144 rotates the lift arms 142 about an axis extending through the pivot. In this regard, the lift arms 142 may be rotated by the lift arm actuators 144 to lift a refuse container over the cab 40. The lift assembly 140 further includes a pair of interface members, shown as lift forks 146, each pivotally coupled to a distal end of one of the lift arms 142. The lift forks 146 may be configured to engage a refuse container (e.g., a dumpster) to selectively couple the refuse container to the lift arms 142. By way of example, each of the lift forks 146 may be received within a corresponding pocket defined by the refuse container. A pair of actuators (e.g., hydraulic cylinders, electric linear actuators, etc.), shown as articulation actuators 148, are each coupled to one of the lift arms 142 and one of the lift forks 146. The articulation actuators 148 may be positioned to rotate the lift forks 146 relative to the lift arms 142 about a horizontal axis. Accordingly, the articulation actuators 148 may assist in tipping refuse out of the refuse container and into the refuse compartment 130. The lift arm actuators 144 may then rotate the lift arms 142 to return the empty refuse container to the ground.

Side-Loading Refuse Vehicle

Figure 8:
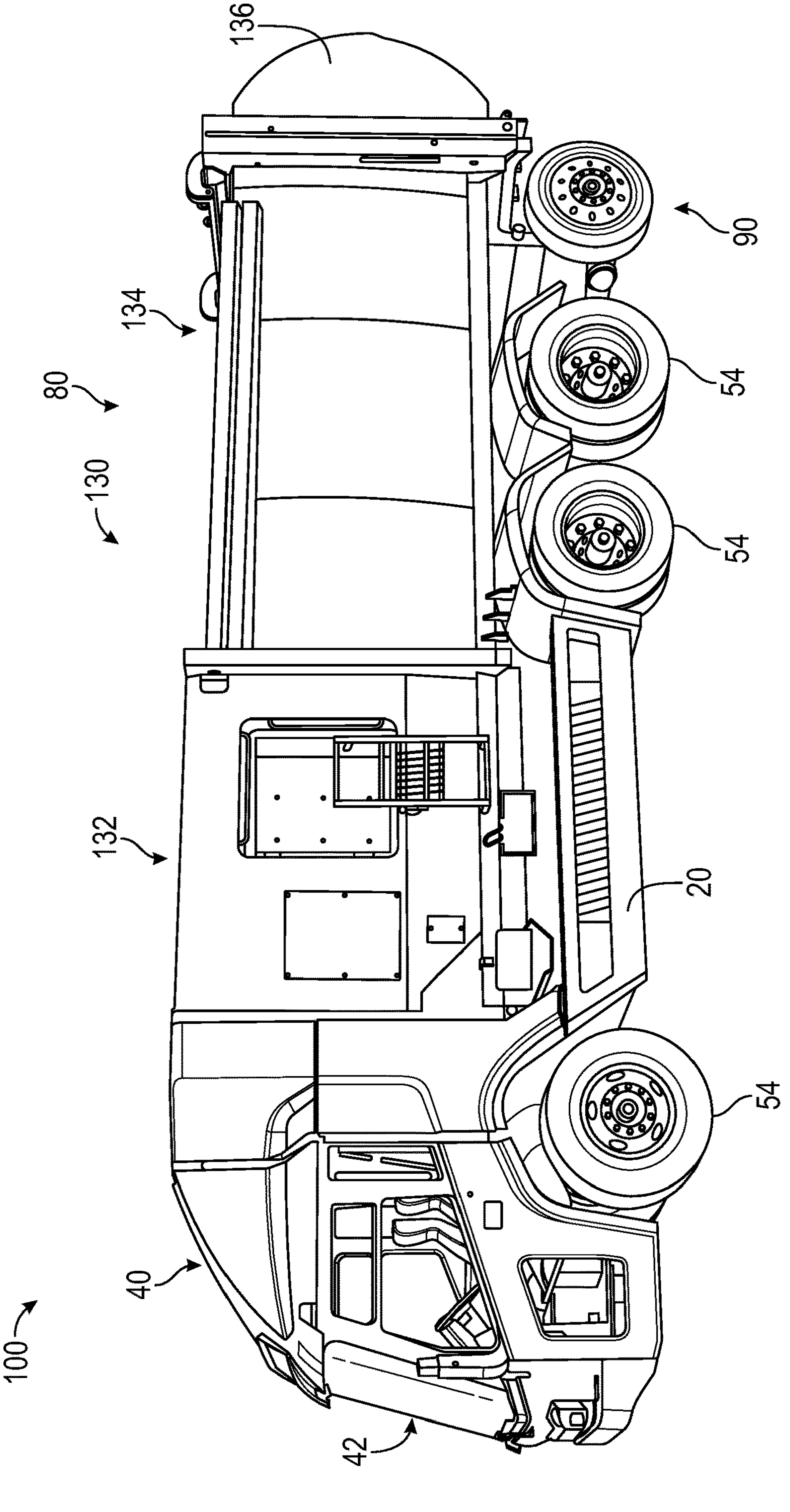
FIG. 8 is a left side view of the side-loading refuse vehicle of FIG. 5 configured with a tag axle.

Referring now to FIGS. 5-8, an alternative configuration of the refuse vehicle 100 is shown according to an exemplary embodiment. Specifically, the refuse vehicle 100 of FIGS. 5-8 is configured as a side-loading refuse vehicle. The refuse vehicle 100 of FIGS. 5-8 may be substantially similar to the front-loading refuse vehicle 100 of FIGS. 3 and 4 except as otherwise specified herein. As shown in FIG. 8, the refuse vehicle 100 of FIGS. 5-7 may be configured with a tag axle 90.

Referring still to FIGS. 5-8, the refuse vehicle 100 omits the lift assembly 140 and instead includes a side-loading lift assembly, shown as lift assembly 160, that extends laterally outward from a side of the refuse vehicle 100. The lift assembly 160 includes an interface assembly, shown as grabber assembly 162, that is configured to engage a refuse container (e.g., a residential garbage can) to selectively couple the refuse container to the lift assembly 160. The grabber assembly 162 includes a main portion, shown as main body 164, and a pair of fingers or interface members, shown as grabber fingers 166. The grabber fingers 166 are pivotally coupled to the main body 164 such that the grabber fingers 166 are each rotatable about a vertical axis. A pair of actuators (e.g., hydraulic motors, electric motors, etc.), shown as finger actuators 168, are configured to control movement of the grabber fingers 166 relative to the main body 164.

The grabber assembly 162 is movably coupled to a guide, shown as track 170, that extends vertically along a side of the refuse vehicle 100. Specifically, the main body 164 is slidably coupled to the track 170 such that the main body 164 is repositionable along a length of the track 170. An actuator (e.g., a hydraulic motor, an electric motor, etc.), shown as lift actuator 172, is configured to control movement of the grabber assembly 162 along the length of the track 170. In some embodiments, a bottom end portion of the track 170 is straight and substantially vertical such that the grabber assembly 162 raises or lowers a refuse container when moving along the bottom end portion of the track 170. In some embodiments, a top end portion of the track 170 is curved such that the grabber assembly 162 inverts a refuse container to dump refuse into the hopper volume 132 when moving along the top end portion of the track 170.

The lift assembly 160 further includes an actuator (e.g., a hydraulic cylinder, an electric linear actuator, etc.), shown as track actuator 174, that is configured to control lateral movement of the grabber assembly 162. By way of example, the track actuator 174 may be coupled to the chassis 20 and the track 170 such that the track actuator 174 moves the track 170 and the grabber assembly 162 laterally relative to the chassis 20. The track actuator 174 may facilitate repositioning the grabber assembly 162 to pick up and replace refuse containers that are spaced laterally outward from the refuse vehicle 100.

Concrete Mixer Truck

Figure 9:
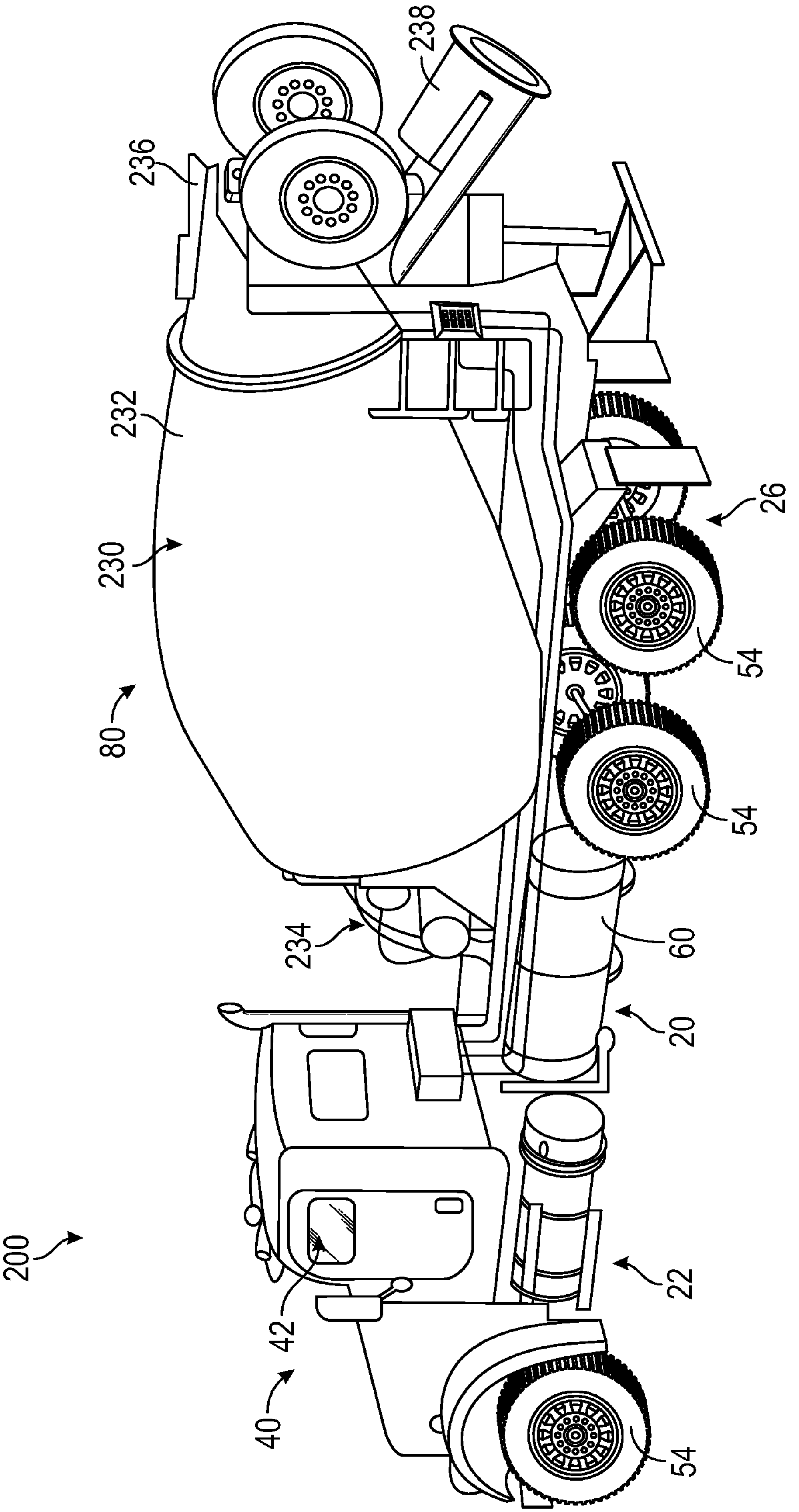
FIG. 9 is a perspective view of the vehicle of FIG. 1 configured as a mixer vehicle, according to an exemplary embodiment.

Referring now to FIG. 9, the vehicle 10 is configured as a mixer truck (e.g., a concrete mixer truck, a mixer vehicle, etc.), shown as mixer truck 200. Specifically, the mixer truck 200 is shown as a rear-discharge concrete mixer truck. In other embodiments, the mixer truck 200 is a front-discharge concrete mixer truck.

As shown in FIG. 9, the application kit 80 includes a mixing drum assembly (e.g., a concrete mixing drum), shown as drum assembly 230. The drum assembly 230 may include a mixing drum 232, a drum drive system 234 (e.g., a rotational actuator or motor, such as an electric motor or hydraulic motor), an inlet portion, shown as hopper 236, and an outlet portion, shown as chute 238. The mixing drum 232 may be coupled to the chassis 20 and may be disposed behind the cab 40 (e.g., at the rear and/or middle of the chassis 20). In an exemplary embodiment, the drum drive system 234 is coupled to the chassis 20 and configured to selectively rotate the mixing drum 232 about a central, longitudinal axis. According to an exemplary embodiment, the central, longitudinal axis of the mixing drum 232 may be elevated from the chassis 20 (e.g., from a horizontal plane extending along the chassis 20) at an angle in the range of five degrees to twenty degrees. In other embodiments, the central, longitudinal axis may be elevated by less than five degrees (e.g., four degrees, etc.). In yet another embodiment, the mixer truck 200 may include an actuator positioned to facilitate adjusting the central, longitudinal axis to a desired or target angle (e.g., manually in response to an operator input/command, automatically according to a control system, etc.).

The mixing drum 232 may be configured to receive a mixture, such as a concrete mixture (e.g., cementitious material, aggregate, sand, etc.), through the hopper 236. In some embodiments, the mixer truck 200 includes an injection system (e.g., a series of nozzles, hoses, and/or valves) including an injection valve that selectively fluidly couples a supply of fluid to the inner volume of the mixing drum 232. By way of example, the injection system may be used to inject water and/or chemicals (e.g., air entrainers, water reducers, set retarders, set accelerators, superplasticizers, corrosion inhibitors, coloring, calcium chloride, minerals, and/or other concrete additives, etc.) into the mixing drum 232. The injection valve may facilitate injecting water and/or chemicals from a fluid reservoir (e.g., a water tank, etc.) into the mixing drum 232, while preventing the mixture in the mixing drum 232 from exiting the mixing drum 232 through the injection system. In some embodiments, one or more mixing elements (e.g., fins, etc.) may be positioned in the interior of the mixing drum 232, and may be configured to agitate the contents of the mixture when the mixing drum 232 is rotated in a first direction (e.g., counterclockwise, clockwise, etc.), and drive the mixture out through the chute 238 when the mixing drum 232 is rotated in a second direction (e.g., clockwise, counterclockwise, etc.). In some embodiments, the chute 238 may also include an actuator positioned such that the chute 238 may be selectively pivotable to position the chute 238 (e.g., vertically, laterally, etc.), for example at an angle at which the mixture is expelled from the mixing drum 232.

Fire Truck

Figure 10:
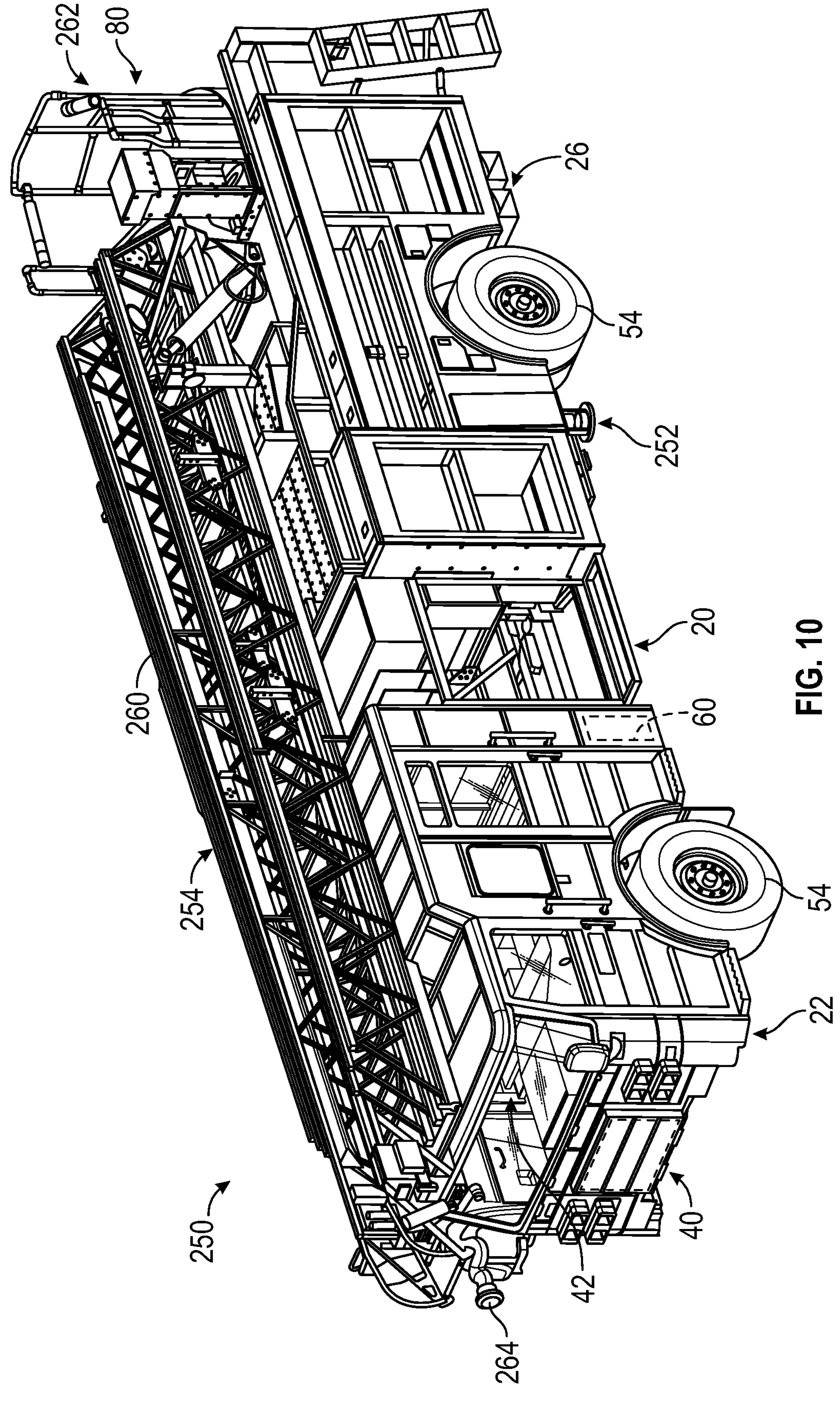
FIG. 10 is a perspective view of the vehicle of FIG. 1 configured as a fire fighting vehicle, according to an exemplary embodiment.

Referring now to FIG. 10, the vehicle 10 is configured as a fire fighting vehicle, fire truck, or fire apparatus (e.g., a turntable ladder truck, a pumper truck, a quint, etc.), shown as fire fighting vehicle 250. In the embodiment shown in FIG. 10, the fire fighting vehicle 250 is configured as a rear-mount aerial ladder truck. In other embodiments, the fire fighting vehicle 250 is configured as a mid-mount aerial ladder truck, a quint fire truck (e.g., including an on-board water storage, a hose storage, a water pump, etc.), a tiller fire truck, a pumper truck (e.g., without an aerial ladder), or another type of response vehicle. By way of example, the vehicle 10 may be configured as a police vehicle, an ambulance, a tow truck, or still other vehicles used for responding to a scene (e.g., an accident, a fire, an incident, etc.).

As shown in FIG. 10, in the fire fighting vehicle 250, the application kit 80 is positioned mainly rearward from the cab 40. The application kit 80 includes deployable stabilizers (e.g., outriggers, downriggers, etc.), shown as outriggers 252, that are coupled to the chassis 20. The outriggers 252 may be configured to selectively extend from each lateral side and/or the rear of the fire fighting vehicle 250 and engage a support surface (e.g., the ground) in order to provide increased stability while the fire fighting vehicle 250 is stationary. The fire fighting vehicle 250 further includes an extendable or telescoping ladder assembly, shown as ladder assembly 254. The increased stability provided by the outriggers 252 is desirable when the ladder assembly 254 is in use (e.g., extended from the fire fighting vehicle 250) to prevent tipping. In some embodiments, the application kit 80 further includes various storage compartments (e.g., cabinets, lockers, etc.) that may be selectively opened and/or accessed for storage and/or component inspection, maintenance, and/or replacement.

As shown in FIG. 10, the ladder assembly 254 includes a series of ladder sections 260 that are slidably coupled with one another such that the ladder sections 260 may extend and/or retract (e.g., telescope) relative to one another to selectively vary a length of the ladder assembly 254. A base platform, shown as turntable 262, is rotatably coupled to the chassis 20 and to a proximal end of a base ladder section 260 (i.e., the most proximal of the ladder sections 260). The turntable 262 may be configured to rotate about a vertical axis relative to the chassis 20 to rotate the ladder sections 260 about the vertical axis (e.g., up to 360 degrees, etc.). The ladder sections 260 may rotate relative to the turntable 262 about a substantially horizontal axis to selectively raise and lower the ladder sections 260 relative to the chassis 20. As shown, a water turret or implement, shown as monitor 264, is coupled to a distal end of a fly ladder section 260 (i.e., the most distal of the ladder sections 260). The monitor 264 may be configured to expel water and/or a fire suppressing agent (e.g., foam, etc.) from a water storage tank and/or an agent tank onboard the fire fighting vehicle 250, and/or from an external source (e.g., a fire hydrant, a separate water/pumper truck, etc.). In some embodiments, the ladder assembly 254 further includes an aerial platform coupled to the distal end of the fly ladder section 260 and configured to support one or more operators.

ARFF Truck

Figure 11:
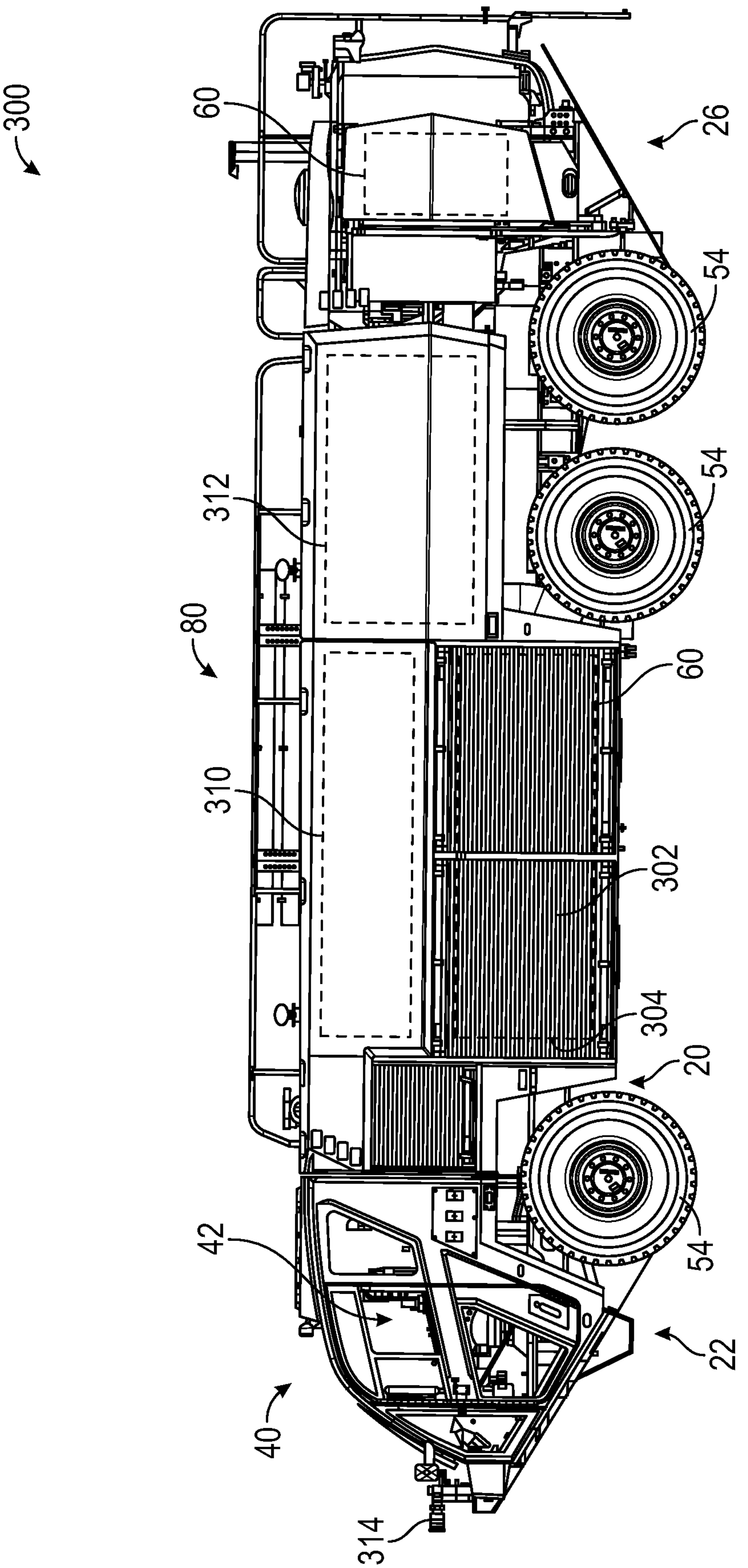
FIG. 11 is a left side view of the vehicle of FIG. 1 configured as an airport fire fighting vehicle, according to an exemplary embodiment.

Referring now to FIG. 11, the vehicle 10 is configured as a fire fighting vehicle, shown as airport rescue and fire fighting (ARFF) truck 300. As shown in FIG. 11, the application kit 80 is positioned primarily rearward of the cab 40. As shown, the application kit 80 includes a series of storage compartments or cabinets, shown as compartments 302, that are coupled to the chassis 20. The compartments 302 may store various equipment or components of the ARFF truck 300.

The application kit 80 includes a pump system 304 (e.g., an ultra-high-pressure pump system, etc.) positioned within one of the compartments 302 near the center of the ARFF truck 300. The application kit 80 further includes a water tank 310, an agent tank 312, and an implement or water turret, shown as monitor 314. The pump system 304 may include a high pressure pump and/or a low pressure pump, which may be fluidly coupled to the water tank 310 and/or the agent tank 312. The pump system 304 may to pump water and/or fire suppressing agent from the water tank 310 and the agent tank 312, respectively, to the monitor 314. The monitor 314 may be selectively reoriented by an operator to adjust a direction of a stream of water and/or agent. As shown in FIG. 11, the monitor 314 is coupled to a front end of the cab 40.

Boom Lift

Figure 12:
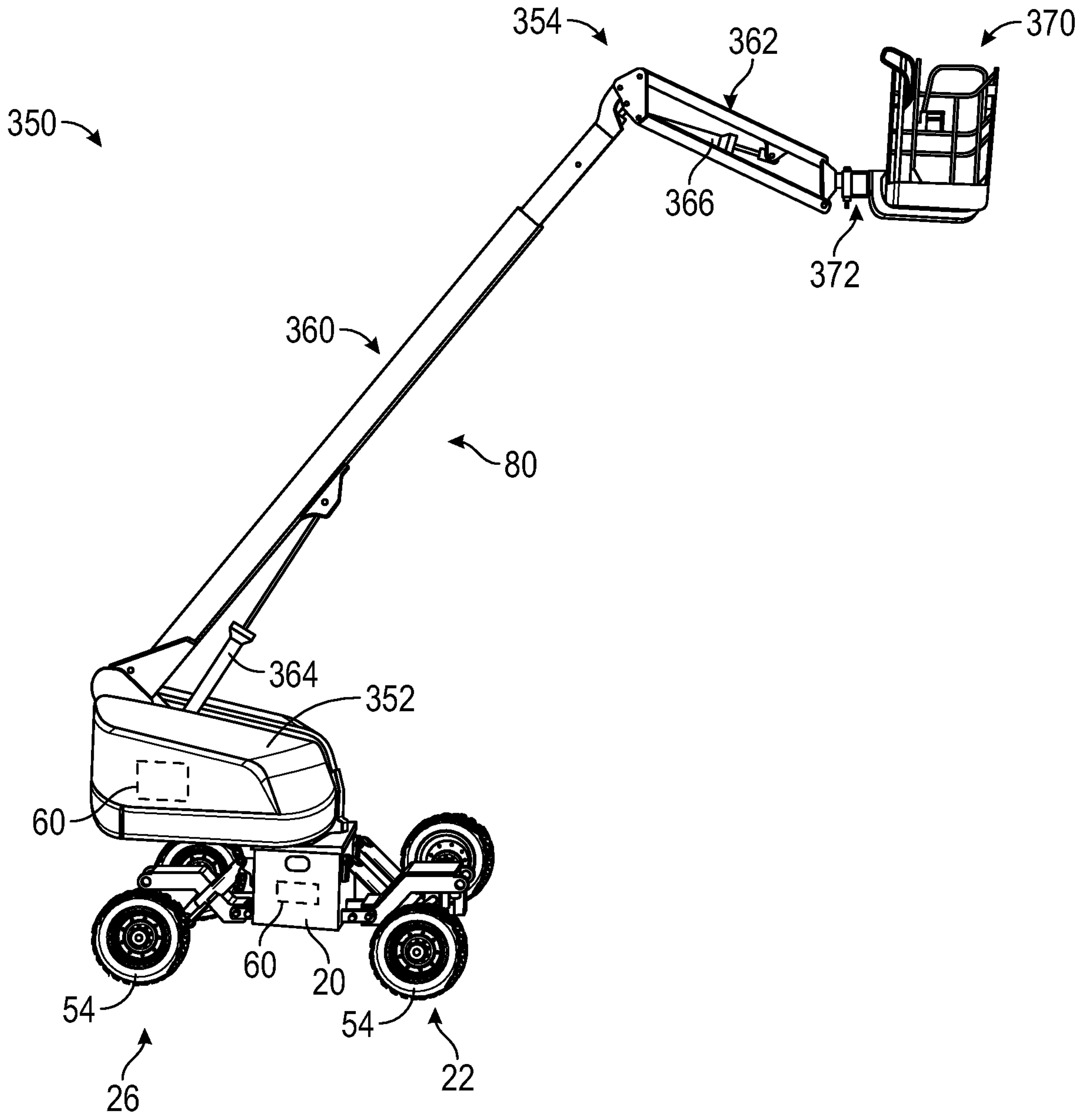
FIG. 12 is a perspective view of the vehicle of FIG. 1 configured as a boom lift, according to an exemplary embodiment.

Referring now to FIG. 12, the vehicle 10 is configured as a lift device, shown as boom lift 350. The boom lift 350 may be configured to support and elevate one or more operators. In other embodiments, the vehicle 10 is configured as another type of lift device that is configured to lift operators and/or material, such as a skid-loader, a telehandler, a scissor lift, a fork lift, a vertical lift, and/or any other type of lift device or machine.

As shown in FIG. 12, the application kit 80 includes a base assembly, shown as turntable 352, that is rotatably coupled to the chassis 20. The turntable 352 may be configured to selectively rotate relative to the chassis 20 about a substantially vertical axis. In some embodiments, the turntable 352 includes a counterweight (e.g., the batteries) positioned near the rear of the turntable 352. The turntable 352 is rotatably coupled to a lift assembly, shown as boom assembly 354. The boom assembly 354 includes a first section or telescoping boom section, shown as lower boom 360. The lower boom 360 includes a series of nested boom sections that extend and retract (e.g., telescope) relative to one another to vary a length of the boom assembly 354. The boom assembly 354 further includes a second boom section or four bar linkage, shown as upper boom 362. The upper boom 362 may includes structural members that rotate relative to one another to raise and lower a distal end of the boom assembly 354. In other embodiments, the boom assembly 354 includes more or fewer boom sections (e.g., one, three, five, etc.) and/or a different arrangement of boom sections.

As shown in FIG. 12, the boom assembly 354 includes a first actuator, shown as lower lift cylinder 364. The lower boom 360 is pivotally coupled (e.g., pinned, etc.) to the turntable 352 at a joint or lower boom pivot point. The lower lift cylinder 364 (e.g., a pneumatic cylinder, an electric linear actuator, a hydraulic cylinder, etc.) is coupled to the turntable 352 at a first end and coupled to the lower boom 360 at a second end. The lower lift cylinder 364 may be configured to raise and lower the lower boom 360 relative to the turntable 352 about the lower boom pivot point.

The boom assembly 354 further includes a second actuator, shown as upper lift cylinder 366. The upper boom 362 is pivotally coupled (e.g., pinned) to the upper end of the lower boom 360 at a joint or upper boom pivot point. The upper lift cylinder 366 (e.g., a pneumatic cylinder, an electric linear actuator, a hydraulic cylinder, etc.) is coupled to the upper boom 362. The upper lift cylinder 366 may be configured to extend and retract to actuate (e.g., lift, rotate, elevate, etc.) the upper boom 362, thereby raising and lowering a distal end of the upper boom 362.

Referring still to FIG. 12, the application kit 80 further includes an operator platform, shown as platform assembly 370, coupled to the distal end of the upper boom 362 by an extension arm, shown as jib arm 372. The jib arm 372 may be configured to pivot the platform assembly 370 about a lateral axis (e.g., to move the platform assembly 370 up and down, etc.) and/or about a vertical axis (e.g., to move the platform assembly 370 left and right, etc.).

The platform assembly 370 provides a platform configured to support one or more operators or users. In some embodiments, the platform assembly 370 may include accessories or tools configured for use by the operators. For example, the platform assembly 370 may include pneumatic tools (e.g., an impact wrench, airbrush, nail gun, ratchet, etc.), plasma cutters, welders, spotlights, etc. In some embodiments, the platform assembly 370 includes a control panel (e.g., a user interface, a removable or detachable control panel, etc.) configured to control operation of the boom lift 350 (e.g., the turntable 352, the boom assembly 354, etc.) from the platform assembly 370 or remotely. In other embodiments, the platform assembly 370 is omitted, and the boom lift 350 includes an accessory and/or tool (e.g., forklift forks, etc.) coupled to the distal end of the boom assembly 354.

Scissor Lift

Figure 13:
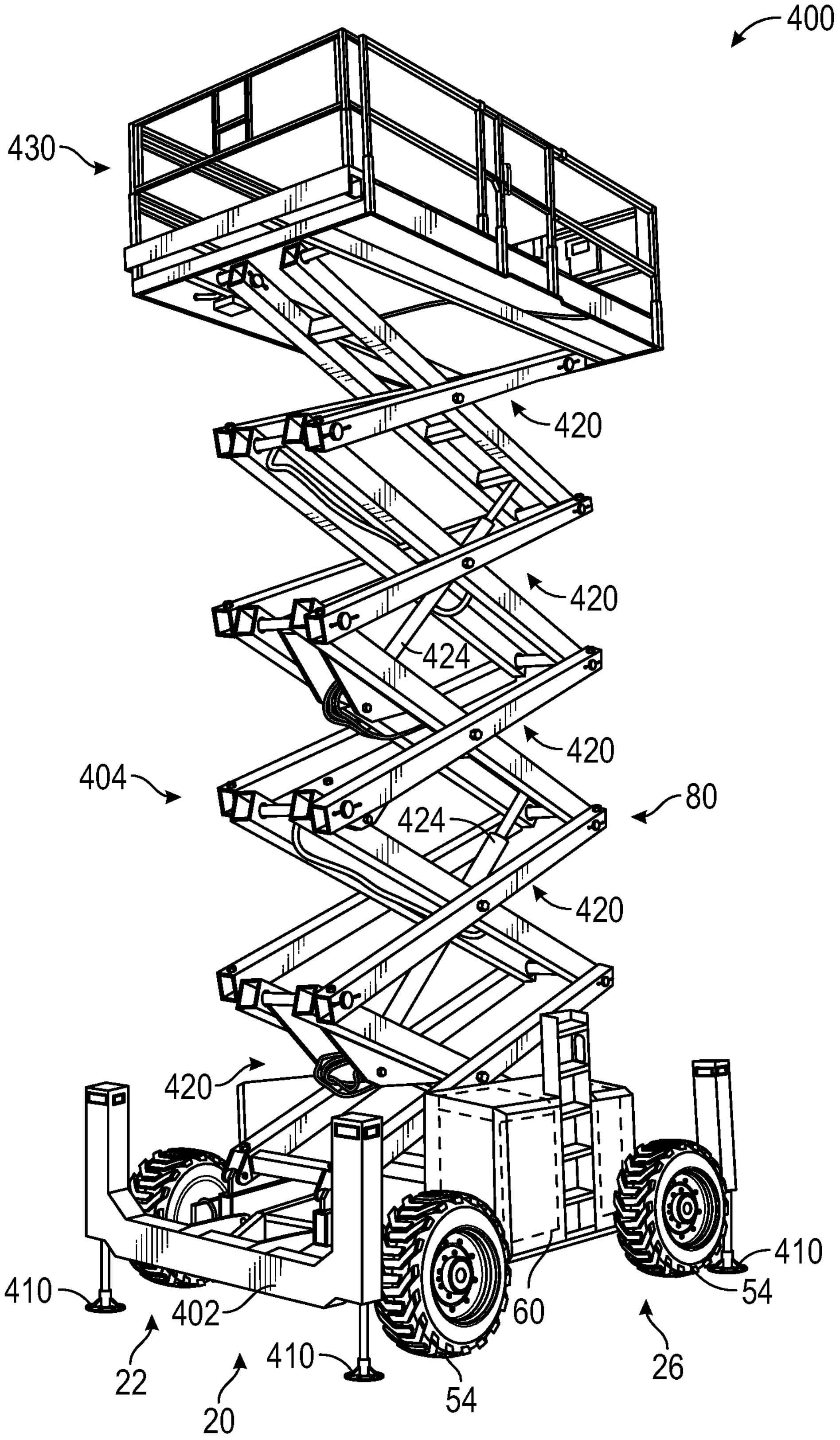
FIG. 13 is a perspective view of the vehicle of FIG. 1 configured as a scissor lift, according to an exemplary embodiment.

Referring now to FIG. 13, the vehicle 10 is configured as a lift device, shown as scissor lift 400. As shown in FIG. 13, the application kit 80 includes a body, shown as lift base 402, coupled to the chassis 20. The lift base 402 is coupled to a scissor assembly, shown as lift assembly 404, such that the lift base 402 supports the lift assembly 404. The lift assembly 404 is configured to extend and retract, raising and lowering between a raised position and a lowered position relative to the lift base 402.

As shown in FIG. 13, the lift base 402 includes a series of actuators, stabilizers, downriggers, or outriggers, shown as leveling actuators 410. The leveling actuators 410 may extend and retract vertically between a stored position and a deployed position. In the stored position, the leveling actuators 410 may be raised, such that the leveling actuators 410 do not contact the ground. Conversely, in the deployed position, the leveling actuators 410 may engage the ground to lift the lift base 402. The length of each of the leveling actuators 410 in their respective deployed positions may be varied in order to adjust the pitch (e.g., rotational position about a lateral axis) and the roll (e.g., rotational position about a longitudinal axis) of the lift base 402 and/or the chassis 20. Accordingly, the lengths of the leveling actuators 410 in their respective deployed positions may be adjusted to level the lift base 402 with respect to the direction of gravity (e.g., on uneven, sloped, pitted, etc. terrain). The leveling actuators 410 may lift the wheel and tire assemblies 54 off of the ground to prevent movement of the scissor lift 400 during operation. In other embodiments, the leveling actuators 410 are omitted.

The lift assembly 404 may include a series of subassemblies, shown as scissor layers 420, each including a pair of inner members and a pair of outer members pivotally coupled to one another. The scissor layers 420 may be stacked atop one another in order to form the lift assembly 404, such that movement of one scissor layer 420 causes a similar movement in all of the other scissor layers 420. The scissor layers 420 extend between and couple the lift base 402 and an operator platform (e.g., the platform assembly 430). In some embodiments, scissor layers 420 may be added to, or removed from, the lift assembly 404 in order to increase, or decrease, the fully extended height of the lift assembly 404.

Referring still to FIG. 13, the lift assembly 404 may also include one or more lift actuators 424 (e.g., hydraulic cylinders, pneumatic cylinders, electric linear actuators such as motor-driven leadscrews, etc.) configured to extend and retract the lift assembly 404. The lift actuators 424 may be pivotally coupled to inner members of various scissor layers 420, or otherwise arranged within the lift assembly 404.

A distal or upper end of the lift assembly 404 is coupled to an operator platform, shown as platform assembly 430. The platform assembly 430 may perform similar functions to the platform assembly 370, such as supporting one or more operators, accessories, and/or tools. The platform assembly 430 may include a control panel to control operation of the scissor lift 400. The lift actuators 424 may be configured to actuate the lift assembly 404 to selectively reposition the platform assembly 430 between a lowered position (e.g., where the platform assembly 430 is proximate to the lift base 402) and a raised position (e.g., where the platform assembly 430 is at an elevated height relative to the lift base 402). Specifically, in some embodiments, extension of the lift actuators 424 moves the platform assembly 430 upward (e.g., extending the lift assembly 404), and retraction of the lift actuators 424 moves the platform assembly 430 downward (e.g., retracting the lift assembly 404). In other embodiments, extension of the lift actuators 424 retracts the lift assembly 404, and retraction of the lift actuators 424 extends the lift assembly 404.

Vehicle Control System

Figure 14:
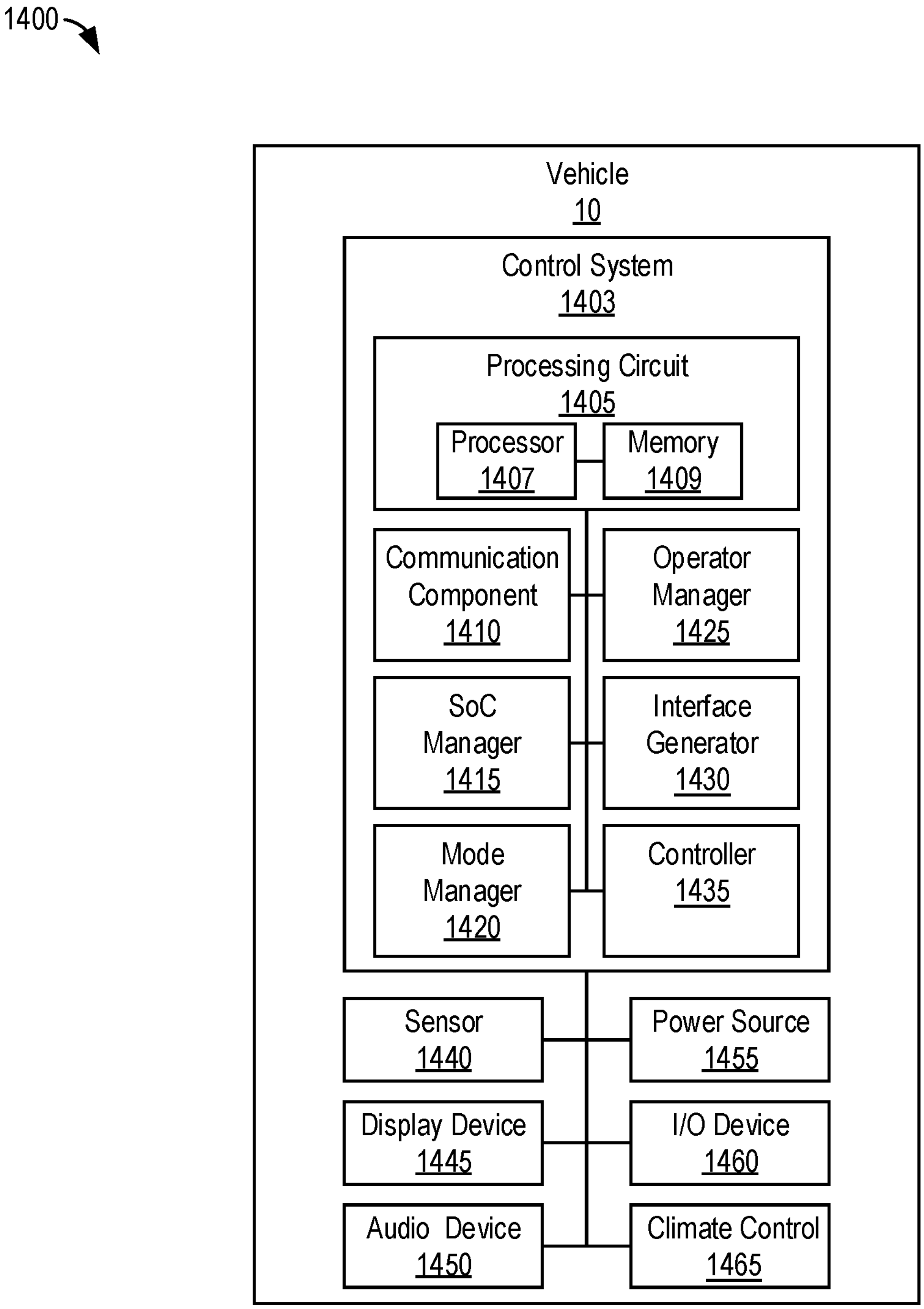
FIG. 14 is a block diagram of a system, according to an exemplary embodiment.

FIG. 14 depicts a block diagram of a system 1400, according to an exemplary embodiment. Each system and/or component of the system 1400 can include one or more processors, memory, network interfaces, and/or user interfaces. The memory can store programming logic that, when executed by the processor, controls the operation of the corresponding computing system or device. The memory can also store data in databases. The network interfaces can allow the systems and/or components of the system 1400 to communicate wirelessly. The various components in the system 1400 can be implemented via hardware (e.g., circuitry), software (e.g., executable code), or any combination thereof. Systems, devices, and components in FIG. 14 can be added, deleted, integrated, separated, and/or rearranged.

The system 1400 can include the vehicle 10. The vehicle 10 can be at least one of the vehicles described herein. The vehicle 10 can include at least one control system 1403, at least one sensor 1440, at least one display device 1445, at least one audio device 1450, at least one power source 1455, at least one input/output (I/O) device 1460 (e.g., I/O device 1460), and at least one climate control 1465. The components of the vehicle 10 and/or the system 1400 can be electrically coupled with one another. For example, the control system 1403 can be electrically coupled with the sensor 1440. The components of the vehicle 10 and/or the components of the system 1400 can also communicate with, interact with, and/or otherwise interface with one another via a controller area network (CAN). For example, the control system 1403 can communicate, via a CAN, with the display device 1445.

The sensor 1440 can be and/or include an accelerometer, a tachometer, a speedometer, a GPS device/sensor, a temperature sensor, a voltmeter, an ammeter, a radar sensor, a camera, a pressure sensor, a tactile sensor, a photodetector, a motion sensor, a proximity sensor, and/or among other possible sensors and/or devices. For example, the sensor 1440 can be a tactile sensor. The sensor 1440 can provide operational data associated with the vehicle 10 to the control system 1403. The operational data associated with the vehicle 10 can be and/or include at least one of a speed of the vehicle 10, an acceleration of the vehicle 10, a location of the vehicle 10, an operator input (e.g., an input provided by an operator of the vehicle 10), images pertaining to the vehicle 10 (e.g., images of the vehicle 10 and/or an area including the vehicle 10 that are generated and/or provided by a camera), and/or an environmental condition of the vehicle 10 (e.g., a temperature of the cab interior 42).

The display device 1445 can be and/or include a screen, a monitor, a visual display device, a television, a video display, a liquid crystal display (LCD), a light emitting diode (LED) display, an infotainment system, a mobile device, and/or among other possible displays and/or devices. For example, the display device 1445 can be an LCD. The display device 1445 can generate, produce, provide and/or otherwise display a user interface. For example, the display device 1445 can display a user interface that includes images of the vehicle 10 that were provided by the sensor 1440.

The audio device 1450 can be and/or include a speaker, a microphone, a headphone, and/or among other possible audio and/or sound devices. For example, the audio device 1450 can be a speaker. The audio device 1450 can produce, provide, generate and/or otherwise create an audible signal.

The power source 1455 can be and/or include an energy storage device (e.g., a battery, capacitors, ultra-capacitors, etc.). For example, the power source 1455 can be and/or include the batteries 60. The power source 1455 can electrically couple with an energy generation device. For example, the power source 1455 can electrically couple with a charging station and/or a device that can provide electrical power and/or electrical energy to the power source 1455. The electrical energy can be stored by the power source 1455 for use in powering the vehicle 10.

The I/O device 1460 can be and/or include a joystick, a button, a toggle switch, a handle, a lever, a steering wheel, a key, a keypad, a console, a mouse, a keyboard, a knob, a dial, a vehicle shifter, a smart phone, a computer, a wearable device, and/or among other possible I/O devices. For example, the I/O device 1460 can be a joystick. An operator of the vehicle 10 can interact with, interface with and/or otherwise engage with the I/O device 1460. For example, the operator can select a vehicle mode button on a joystick (e.g., the I/O device 1460). The operating engaging with the I/O device 1460 can result in the I/O device 1460 communicating with the control system 1403 and/or a component of the system 1400.

The climate control 1465 can be and/or include a vehicle climate control system, an HVAC system, a heater, a fan, an air conditioner, and/or among other possible devices and/or systems. For example, the climate control 1465 can be a vehicle climate control system. The climate control 1465 can change, adjust, maintain and/or otherwise control an environmental condition of the vehicle 10. For example, the climate control 1465 can control the temperature within the interior cab 42.

The control system 1403 can include at least one processing circuit 1405. The processing circuit 1405 can include at least one processor 1407 and memory 1409. The memory 1409 can be one or more devices (e.g., RAM, ROM, Flash memory, hard disk storage) for storing data and/or computer code for completing and/or facilitating the various processes described herein. For example, the memory 1409 can store instructions and the instructions can cause the processor 1407 to perform functionality similar to that one the control system 1403 and/or a component thereof. The memory 1409 can be or include non-transient volatile memory, non-volatile memory, and non-transitory computer storage media. The Memory 1409 can include database components, object code components, script components, or any other type of information structure for supporting the various activities and information structures described herein. The memory 1409 can be communicably coupled with the processor 1407. The memory 1409 can also be electrically coupled with the processor 1407. The memory 1409 can include computer code or instructions for executing one or more processes described herein. The processor 1407 can be implemented as one or more application specific integrated circuits (ASICs), one or more field programmable gate arrays (FPGAs), a group of processing components, and/or other suitable electronic processing components.

The control system 1403 can also include at least one communication component 1410, at least one State of Charge manager 1415 (e.g., SoC manager 1415), at least one mode manager 1420, at least one operator manager 1425, at least one interface generator 1430, and at least one controller 1435. The communication component 1410 can interact with, interface with and/or otherwise communicate with at least one component included in the system 1400. For example, the communication component 1410 can communicate with the display device 1445.

The communication component 1410 can receive, from the sensor 1440, data that was generated, collected, detected, obtained and/or otherwise acquired by the sensor 1440. For example, the sensor 1440 can detect data pertaining to the charging of the power source 1455. The communication component 1410 can provide, responsive to receiving the data from the sensor 1440, the data to the SoC manager 1415.

The SoC manager 1415 can, using the data that was received from the communication component, determine a State of Charge (SoC) of the power source 1455. The SoC of the power source 1455 can be and/or include a current value, a calculated value, and/or a predicted value. The SoC manager 1415 can provide, responsive to determining the SoC of the power source 1455, the SoC of the power source 1455 to the interface generator 1430.

The interface generator 1430 can receive, from the SoC manager 1415, the SoC of the power source 1455. The interface generator 1430 can generate a user interface and/or otherwise generate information that can be used to generate a user interface. For example, the interface generator 1430 can provide signals to a display device (e.g., the display device 1445) that causes the display device to display a user interface that includes information generated by the interface generator 1430.

The interface generator 1430 can include the SoC of the power source 1455 in the signals that are provided to the display device. The interface generator 1430 can, responsive to generating the user interface, communicate with the communication component 1410. For example, the interface generator 1430 can provide, to the communication component 1410, the user interface and/or the signals associated with the user interface. The communication component 1410 can, responsive to communicating with the interface generator 1430, provide the user interface to the display device 1445. The display device can, responsive to receiving the user interface, produce, provide, and/or otherwise display the user interface that was generated by the interface generator 1430.

The SoC manager 1415 can determine whether the vehicle 10 and/or the power source 1455 is electrically coupled with a charging station and/or other possible Electric Vehicle Supply Equipment (EVSE). For example, the SoC manager 1415 can receive from the communication component 1410 data that was detected by the sensor 1440. The data can include information about an amount of current flowing from a charging port of the vehicle 10 to the power source 1455. The SoC manager 1415 can, using the data, determine that the power source 1455 is charging. For example, the SoC manager 1415 can determine that the amount of current flowing from the charging port to the power source 1455 is above a predetermined threshold and the current being above the predetermined threshold can indicate that the power source 1455 is being charged. Similarly, the SoC manager 1415 can determine, responsive to the sensor 1440 providing data that indicates a switch has been actuated, that the power source 1455 is being charged. For example, a power cord that is electrically coupled with the charging station can, responsive to electrically coupling with the power source 1455, actuate a switch. The sensor 1440 can detect the actuation of the switch and the sensor 1440 can provide information, to the SoC manager 1415, including the detection of the actuation of the switch.

The mode manager 1420 can determine a mode of the vehicle 10. The vehicle 10 can have at least one drive mode, at least one collection mode, and at least one dump mode. The current mode (e.g., drive mode, collection mode, or dump mode) can determine what components, devices, and/or systems of the vehicle 10 are activated and/or deactivated. For example, the arms 142 can be deactivated and/or otherwise locked (e.g., inoperable) when the vehicle 10 is in drive mode. The deactivation of the arms 142, while the vehicle 10 is in drive mode, can prevent accidental and/or incidental utilization of the arms 142. For example, while in drive mode that I/O device 1460 that controls the arms 142 if engaged would not result in activation of the arms 142.

The mode manager 1420 can use data received from the sensor 1440 (e.g. a speed of the vehicle 10) and/or data received from the I/O device 1460 (e.g., selection of a button included with the I/O device 1460). For example, the mode manager 1420 can receive a current speed of the vehicle 10. The mode manager 1420 can compare the current speed of the vehicle 10 with at least one predetermined threshold. The mode manager 1420 can use the comparison of the current speed of the vehicle 10 with the predetermined threshold to determine the mode of the vehicle. For example, the current speed of the vehicle 10 can be 28 miles per hour (MPH) and a predetermined threshold for drive mode can be 20 MPH. To continue this example, the mode manager 1420 can determine that the current speed of the vehicle 10 is above the predetermined threshold resulting in the mode manager 1420 determining that the vehicle 10 is in drive mode.

The mode manager 1420 can, responsive to determining the mode of the vehicle 10, communicate with the controller 1435. For example, the mode manager 1420 can provide, to the controller 1435, an indication that the vehicle 10 is in the drive mode. The controller 1435 can interact with, interface with and/or otherwise control at least one component of the vehicle 10. For example, the controller 1435 can control the tailgate actuator 138. The controller 1435 can, responsive to receiving the indication that the vehicle 10 is in drive mode, deactivate the tailgate actuator 138. For example, if an operator of the vehicle 10 were to interact with the I/O device 1460, associated with the tailgate actuator 138, the tailgate actuator 138 would not respond to the interaction (e.g., the tailgate actuator 138 would not move the tailgate 136). The controller 1435 can also deactivate lift systems, hydraulics and/or pneumatic circuits (e.g., conduits, valves, pumps, compressors, gauges, reservoirs, accumulators, etc.) that are to move components of the vehicle 10. For example, the controller 1435 can, responsive to receiving the indication that the vehicle 10 is in drive mode, deactivate the lift arm actuators 144.

The mode manager 1420 can, responsive to determining that the vehicle 10 is in the drive mode, communicate with the interface generator 1430. The mode manager 1420 can provide, to the interface generator 1430, the indication that the vehicle 10 is in drive mode. The interface generator 1430 can generate and/or otherwise collect information (e.g., camera views provided by the sensors 1440, vehicle speed, vehicle location, pickup location, etc.) that can be included in a user interface. For example, the interface generator 1430 can communicate with the sensors 1440 and the sensors 1440 can provide to the interface generator 1430 camera views (e.g., an aerial view of the vehicle 10, a 360 view of the vehicle 10, a rear right view of the vehicle 10, etc.). The interface generator 1430 can, responsive to communicating with the sensors 1440, provide the collected information to the display device 1445. The display device 1445 receiving the information can cause the display device 1445 to display the user interface that was generated by the interface generator 1430.

As another example, the mode manager 1420 can determine that the vehicle 10 is in a collection mode. The mode manager 1420 can determine that the vehicle 10 is in the collection mode responsive to receiving information (e.g., operational data) associated with the vehicle 10. For example, the sensors 1440 can provide, to the mode manager 1420, a speed of the vehicle 10, operator input, vehicle location, and/or among other possible operational data associated with the vehicle 10. The mode manager 1420 can determine, using the operational data, that the vehicle 10 is in the collection mode. For example, the mode manager 1420 can compare the vehicle speed with a predetermined threshold associated with collection mode. To continue this example, the vehicle speed can be 5 MPH and the predetermined threshold for collection mode can be 8 MPH. In this example, the mode manager 1420 can determine that the vehicle 10 is in collection mode responsive to the vehicle speed being smaller than the predetermined threshold.

As another example, the mode manager 1420 can use the vehicle speed of the vehicle 10 and operator input to determine that the vehicle 10 is in collection mode. For example, the mode manager 1420 can determine that speed of the vehicle 10 is below the predetermined threshold for collection mode and the mode manager 1420 can determine that the operator of the vehicle 10 is also interacting with the I/O device 1460 (e.g., move a joystick that controls the arms 142). In this example, if the vehicle 10 was previously operating in drive mode, the mode manager 1420 can determine that the vehicle 10 is now operating in collection mode. The mode manager 1420 can, responsive to determining that the vehicle 10 has switched from drive mode to collection mode, communicate with the controller 1435. The mode manager 1420 can provide, to the controller 1435, an indication that the vehicle 10 is now operating in collection mode. The controller 1435 can, responsive to receiving the indication that the vehicle 10 is operating in collection mode, reactive components that were deactivated in drive mode and/or unlock components that were locked during drive mode. For example, the arms 142 can be locked during drive mode and the controller 1435 can send a signal to the arms 142 that causing the arms 142 to be unlocked while the vehicle 10 is in collection.

The mode manager 1420 can provide, to the interface generator 1430, the indication that the vehicle 10 is in collection mode. The interface generator 1430 can generate and/or otherwise collect information (e.g., camera views provided by the sensors 1440, vehicle speed, vehicle location, pickup location, etc.) that can be included in a user interface. For example, the interface generator 1430 can communicate with the sensors 1440 and the sensors 1440 can provide to the interface generator 1430 camera views (e.g., an aerial view of the vehicle 10, a 360 view of the vehicle 10, a rear right view of the vehicle 10, etc.). The interface generator 1430 can, responsive to communicating with the sensors 1440, provide the collected information to the display device 1445. The display device 1445 receiving the information can cause the display device 1445 to display the user interface that was generated by the interface generator 1430.

The display device 1445 can have a first view (e.g., a first user interface displayed by the display device 1445) when the vehicle 10 is in the drive mode (e.g., a first mode). The display device 1445 can have a second view (e.g., a second user interface displayed by the display device 1445) when the vehicle 10 is in collection mode (e.g., a second mode). The mode manager 1420 determining whether the vehicle 10 is in collection mode or drive mode can determine which view is displayed by the display device 1445. For example, the first view can have a first set of vehicle views (e.g., an aerial view and a hopper view) and the second view can have a second set of vehicle views (e.g., a side view and a rear right view).

As another example, the mode manager 1420 can use operator input to determine if the vehicle 10 is in collection mode and/or dump mode. For example, the vehicle 10 can be in collection mode and while in collection mode the operator of the vehicle 10 can interact with the I/O device 1460 associated with the tailgate 136. The mode manager 1420 can, responsive to determining that the operator of the vehicle 10 is using tailgate 136, determine that the vehicle 10 is in dump mode. For example, the sensors 1440 can detect that the operator interacting with the I/O device 1460 and the sensor 1440 can send a signal to the mode manager 1420. The mode manager 1420 can then determine that the vehicle 10 is in dump mode.

The operator manager 1425 can determine when the operator of the vehicle 10 is entering, exiting, and/or otherwise interacting with the doors 44. For example, the operator manager 1425 can determine when the operator of the vehicle 10 opens the door 44. The opening and/or closing of the doors 44 can determine what user interface is displayed by the display device 1445. For example, while the vehicle 10 is off and the vehicle is charging (e.g., power is being provided to the power source 1455 from a charging station) and responsive to the door 44 being opened, the operator manager 1425 can communicate with the interface generator 1430. The operator manager 1425 can provide an indication that the door 44 has been opened. The interface generator 1430 can generate a user interface that includes information pertaining to the charging of the vehicle 10. For example, the user interface can include information generated by the sensors 1440 and/or the SoC manager 1415 (e.g., SoC of the vehicle 10, whether the vehicle is charging, etc.). The interface generator 1430 can communicate to the display device 1445. The interface generator 1430 can provide, to the display device 1445, the information pertaining to the charging of the vehicle 10. The display device 1445 receiving the information can cause the display device 1445 to display a user interface that includes the information. The display device 1445 can display the user interface for a predetermined amount of time. For example, the display device 1445 can display the user interface for 30 seconds. As another example, the display device 1445 can display the user interface for 1 minute. The display device 1445 can also display the user interface until the operator of the vehicle 10 closes the door 44.

The operator manager 1425 can detect, track, and/or otherwise monitor operation of the vehicle 10. The operator manager 1425 can receive, from the sensor 1440, information pertaining to the vehicle 10. The information can include operational data of the vehicle 10. For example, the information can include a distance between the vehicle 10 and an object (e.g., a curb, a lane in the road, a vehicle, and/or among other objects). The operator manager 1425 can compare the operational data to a predetermined set of operational data. For example, the operator manager 1425 can compare the distance between the lane in the road and the vehicle 10 with a predetermined distanced. The operator manager 1425 can determine that the difference indicates a deviation in the operation of the vehicle 10. For example, the operator manager 1425 can determine that vehicle is departing the lane in the road.

The operator manager 1425 can communicate, responsive to determining the deviation in the operation of the vehicle, with the controller 1435. The operator manager 1425 can provide, to the controller 1435, an indication of the deviation in the operation of the vehicle. The controller 1435 can communicate with and/or otherwise interact with at least one of the audio device 1450 and/or the display device 1445. For example, the controller 1435 can send a signal to the audio device 1450 that causes the audio device to produce an audible alert. The audible alert can include the deviation in the operation of the vehicle 10. For example, the audible alert can indicate a lane departure warning. The audible alert can include at least one of a collision warning, a blind spot warning, a component error warning (e.g., the lift arm 142 is experiencing a malfunction, etc.), and/or among other possible alerts.

Figure 15:
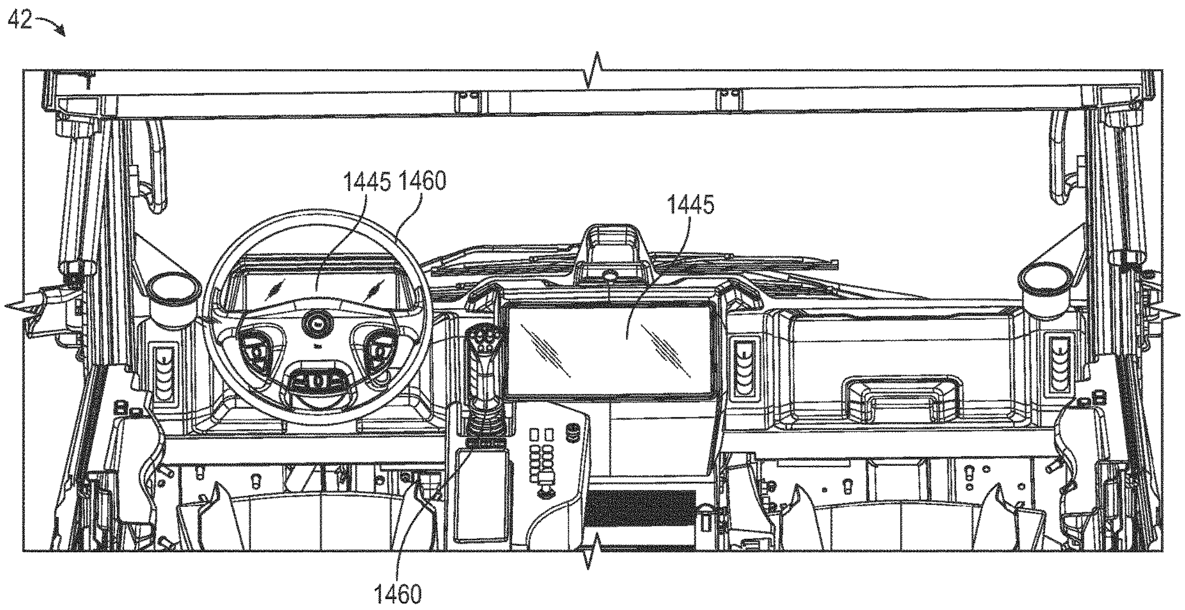
FIG. 15 is a perspective view of a cab interior of a vehicle, according to an exemplary embodiment.

FIG. 15 depicts a perspective view of the cab interior 42, according to an exemplary embodiment. The cab interior 42 can include the display device 1445 and the I/O device 1460. FIG. 15 depicts the cab interior 42 including both a first display device 1445 as an instrument cluster display and a second display device 1445 as a center console display. The first display device 1445 and/or second display device 1445 can display at least one user interface. For example, the first display device 1445 can display a user interface having a first view of the vehicle 10 while the vehicle 10 is in collection mode and the second display device 1445 can display a user interface having a first view of the vehicle 10. The first view displayed by the first user device 1445 can be different that the first view displayed by the second user device 1445.

FIG. 15 also depicts the cab interior 42 including both a first I/O device 1460 as a steering wheel and a second I/O device 1460 as a joystick. The operator of the vehicle 10 can interact with the second I/O device 1460 to engage and/or otherwise operate at least one component of the vehicle 10. For example, the operator of the vehicle 10 can use the second I/O device 1460 to active the tailgate actuator 138. Additionally, the operator of the vehicle 10 engaging with the second I/O device 1460 can result in the sensors 1440 detecting the interaction. The sensors 1440 can, responsive to detecting the interaction, communication with the control system 1403. The control system 1403 and/or a component thereof can receive the communication from the sensor 1440. For example, the mode manager 1420 can receive, from the sensor 1440, the detection of the interaction. The mode manager 1420 can determine, based on the interaction, that the vehicle 10 is in dump mode.

Figure 16:
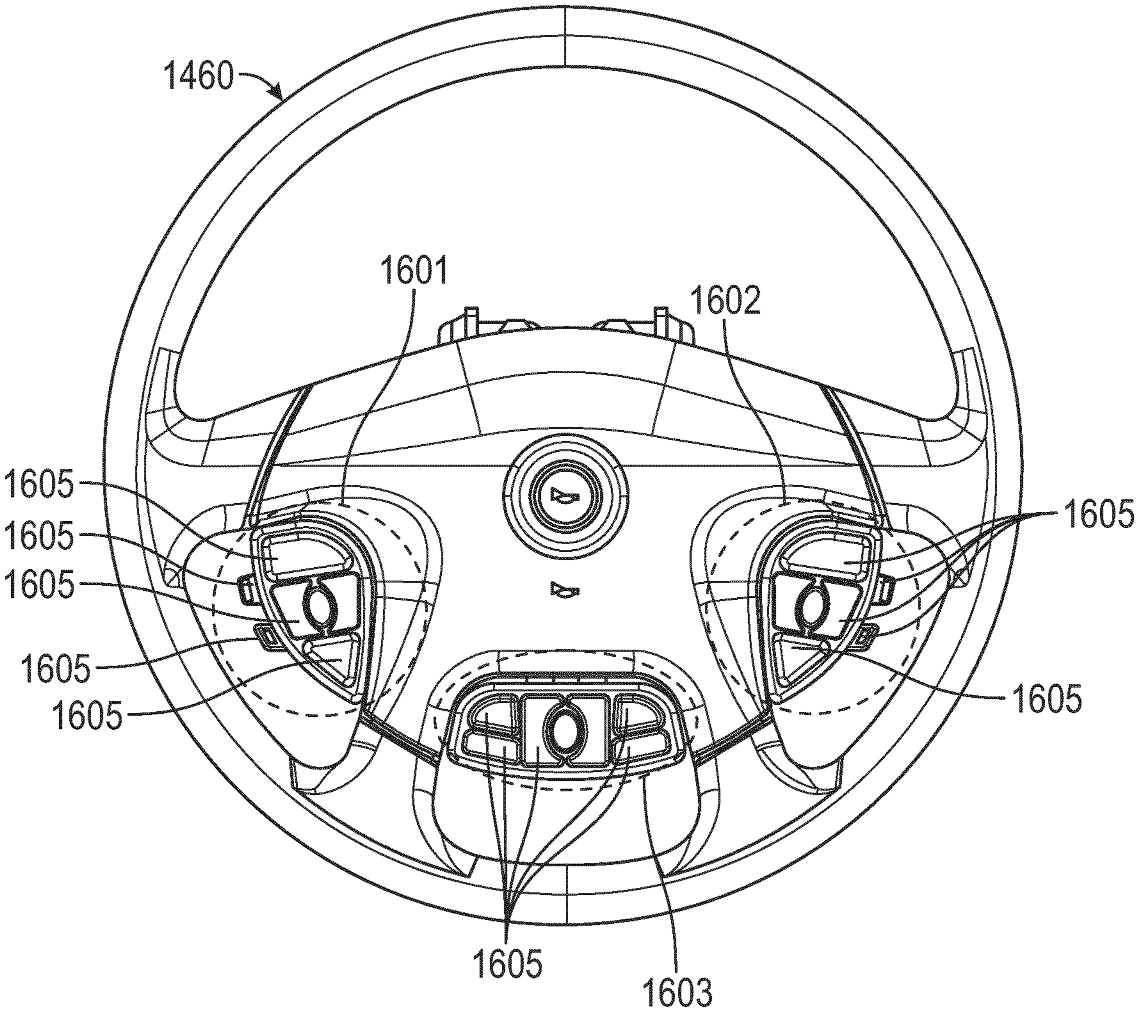
FIG. 16 is a perspective view of a steering wheel, according to an exemplary embodiment.

FIG. 16 depicts a perspective view of a steering wheel (e.g., the first I/O device 1460 shown in FIG. 15), according to an exemplary embodiment. The first I/O device 1460 can have a plurality of zones (e.g., zones 1601, 1602 and 1603). Each zone can have a plurality of buttons (e.g., buttons 1605). Each button can result the vehicle 10 and/or a component thereof performing a certain function, task and/or action. A role (e.g., an action that results from interacting with buttons 1605) of each button 1605 can be configured, customized and/or otherwise established by the operator of the vehicle 10. For example, the operator of the vehicle 10 can establish the buttons 1605 of the zone 1602 can control an environmental condition of the vehicle 10 (e.g., the buttons 1605 can raise and/or lower the temperature of in the interior cab 42, adjust the HVAC fan speed, turn on or off the defrost, etc.). To continue this example, a first button 1605 in the zone 1602 can toggle, adjust, modify and/or other control HVAC modes (e.g., face, face and feet, feet, feet and defrost, defrost, auto, off, etc.), a second button 1605 in the zone 1602 can toggle, adjust, modify, and/or otherwise control blower speed (e.g., high, medium, low, etc.) and a third button 1605 of the zone 1602 can toggle, adjust, modify and/or otherwise change the temperature of the interior of the cable 42 (e.g., change temperature from 70 degrees Fahrenheit to 68 degrees Fahrenheit). The buttons 1605 of the zone 1602 can be and/or include separate I/O devices 1460. The interaction with the buttons 1605 can result in the climate control 1465 receiving signals from the control system 1403 causing the climate control 1465 to adjust the environmental conditions of the interior cab 42.

As another example, the operator of the vehicle 10 can establish that the buttons 1605 of the zone 1601 can control components of the vehicle 10. For example, a first button 1605 of the zone 1601 can activate, deactivate, move and/or otherwise control the tailgate actuator 138, a second button 1605 of the zone 1601 can activate, deactivate, move and/or otherwise control the arms 142, and a third button 1605 of the zone 1601 can activate, deactivate, move and/or otherwise control the lift actuator 172. The buttons 1605 of the zone 1601 can be and/or include separate I/O devices 1460. The interaction with the buttons 1605 can result in the controller 1435 sending signals to the components of the vehicle 10 that correspond to the button 1605 engaged by the operator of the vehicle 10.

Figure 17:
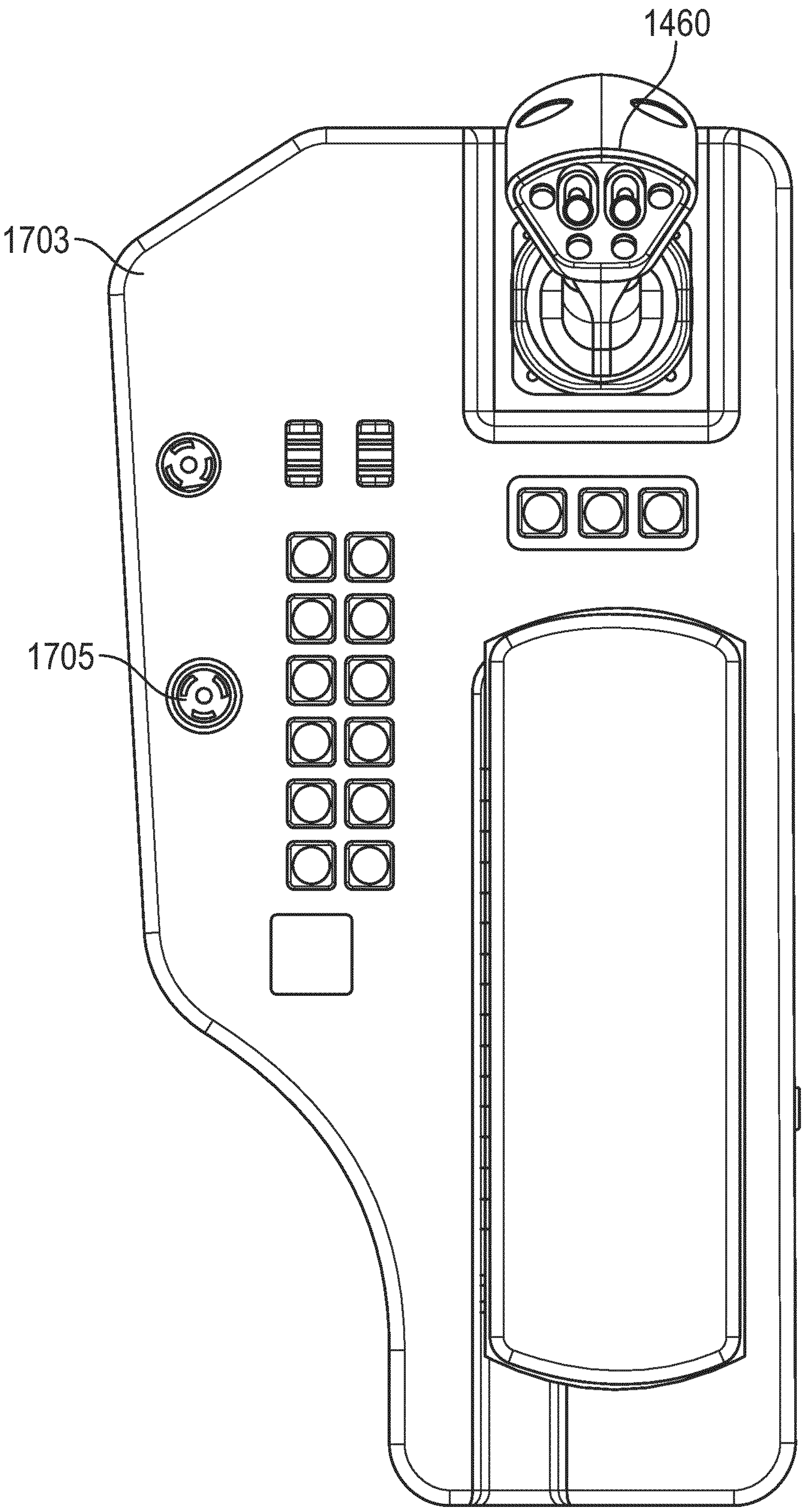
FIG. 17 is a perspective view of a panel, according to an exemplary embodiment.

FIG. 17 depicts a perspective view of a panel 1703, according to an exemplary embodiment. The panel 1703 can be housed within the interior cab 42. The panel 1703 can include the second I/O device 1460 (e.g., the joystick). The panel 1703 can also include at least one button 1705. The button 1705 can active and/or deactivate the braking components (e.g., brake actuators, brake pads, brake discs, brake drums, etc.) and/or brake system of the vehicle 10. The button 1705 can be and/or include the I/O device 1460. The operator engaging with the button 1705 can result in the I/O device 1460 communicating with the control system 1403. For example, the operator manager 1425 can receive, from the I/O device 1460, an indication that the operator of the vehicle 10 has engaged the button 1705. The operator manager 1425 can communicate to the controller 1435 the indication and the controller 1435 can deactivate and/or activate the brake system of the vehicle 10.

Figure 18:
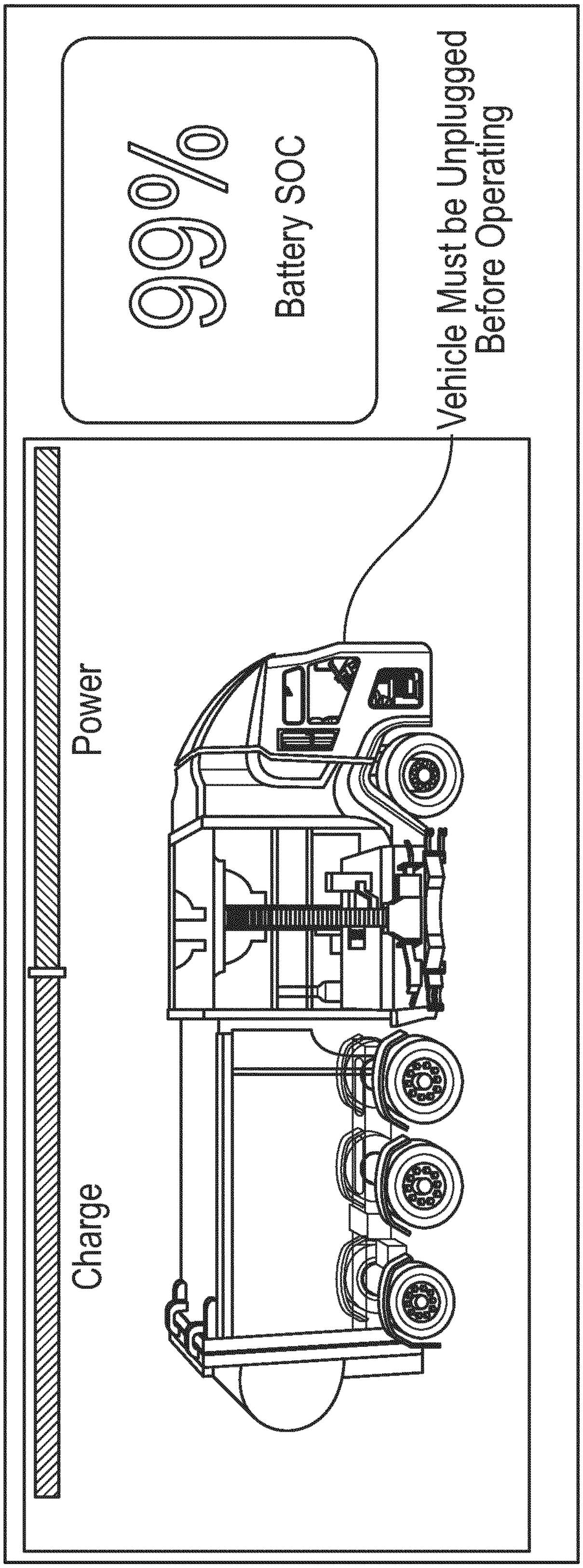
FIG. 18 is a user interface depicting a charge cycle for an electric vehicle, according to an exemplary embodiment.

FIG. 18 depicts a user interface 1800 depicting a charge cycle for an electric vehicle, according to an exemplary embodiment. The user interface 1800 can depict a charge cycle for the vehicle 10. For example, the user interface 1800 can be a user interface that is generated by the interface generator 1430 and displayed by the display device 1445. The user interface 1800 can include the SoC of the vehicle 10, an icon including a warning to unplug the vehicle before operating, and a graphical representation of the vehicle 10.

The user interface 1800 can be generated responsive to the operator of the vehicle 10 opening the door 44. For example, the operator manager 1425 can determine that the door 44 has been opened and the operator manager 1425 can provide, to the interface generator 1430, an indication that the door 44 has been opened. The interface generator 1430 can then generate a user interface (e.g., the user interface 1800) including information pertaining to the charging of the vehicle 10. The information can include the SoC of the vehicle 10. The interface generator 1430 can provide the user interface 1800 to the display device 1445. The display device 1445 receiving the user interface 1800 can cause the display device 1445 to display the user interface 1800.

Figure 19:
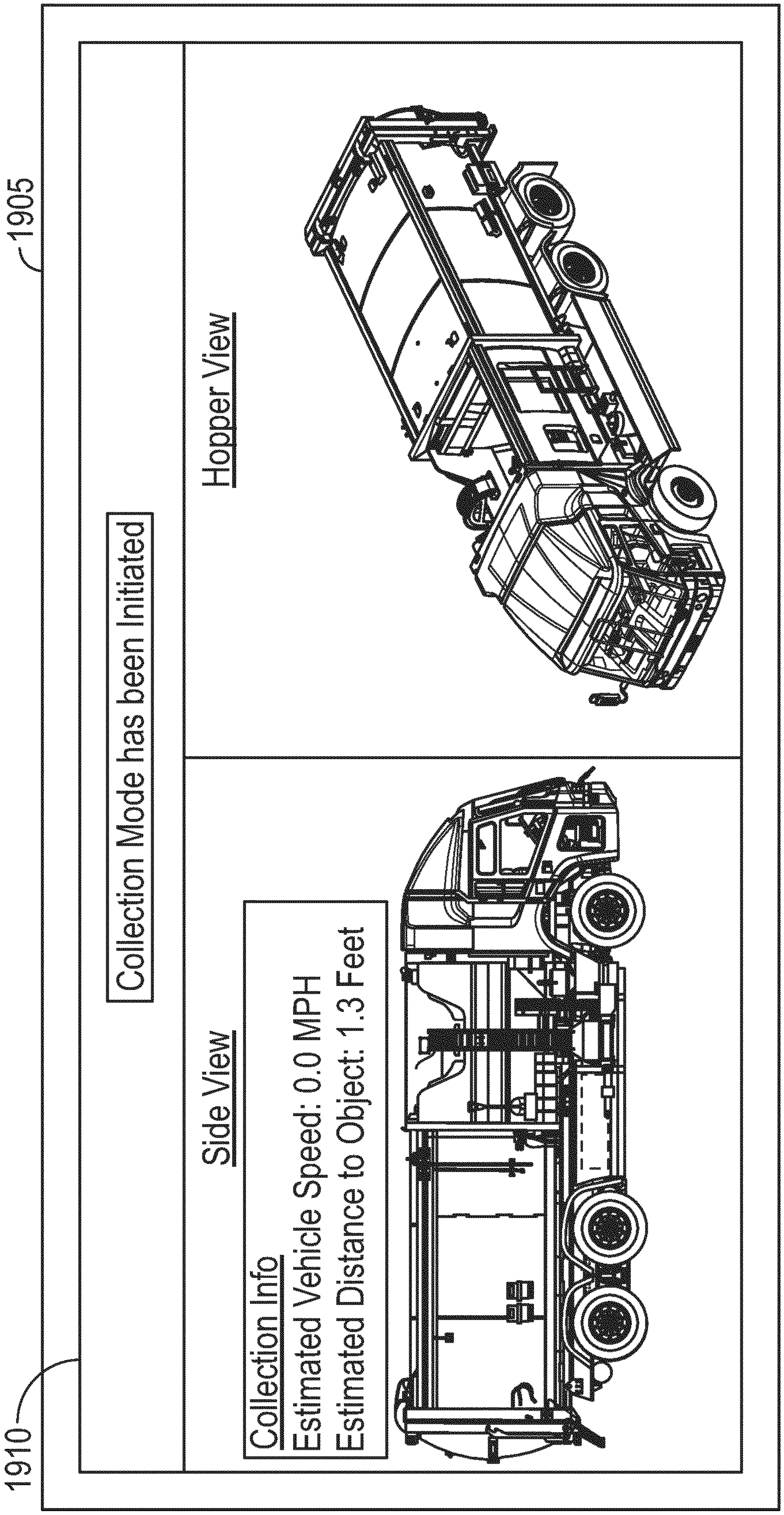
FIG. 19 is a perspective view of a display device including a user interface, according to an exemplary embodiment.

FIG. 19 depicts a perspective view of a display device 1905 including a user interface 1910, according to an exemplary embodiment. The display device 1905 can be the display device 1445. For example, the display device 1905 can be the second display device 1445 (e.g., the center console display depicted in FIG. 15). The user interface 1910 can be generated by the interface generator 1430. The user interface 1910 can be generated responsive to the mode manager 1420 determining that the vehicle 10 is in collection mode. The information shown in the user interface 1910 can be information generated, provided and/or otherwise created by components in the system 1400. The user interface 1910 can include at least one view of the vehicle 10. For example, the user interface 1910 can include a side view of the vehicle 10 and a hopper view of the vehicle 10. The views can be views that are provided by the sensors 1440. The user interface 1910 can also include a text box that includes the current mode of the vehicle 10. FIG. 19 depicts an example of the text box indicating that collection mode has been initiated. The user interface 1910 can also include a text box that includes collection information. FIG. 19 depicts an example of the collection information including an estimated vehicle speed and an estimated distance to an object (e.g., a garbage can). While FIG. 19 depicts the user interface 1900 including a side view and a hopper view, the user interface 1900 can include at least one of an aerial view, a 360 view, a rear right view, a rear left view, a rear view, a side right view, a side left view, a front right view, a front left view, a front view and/or among other possible views.

Figure 20:
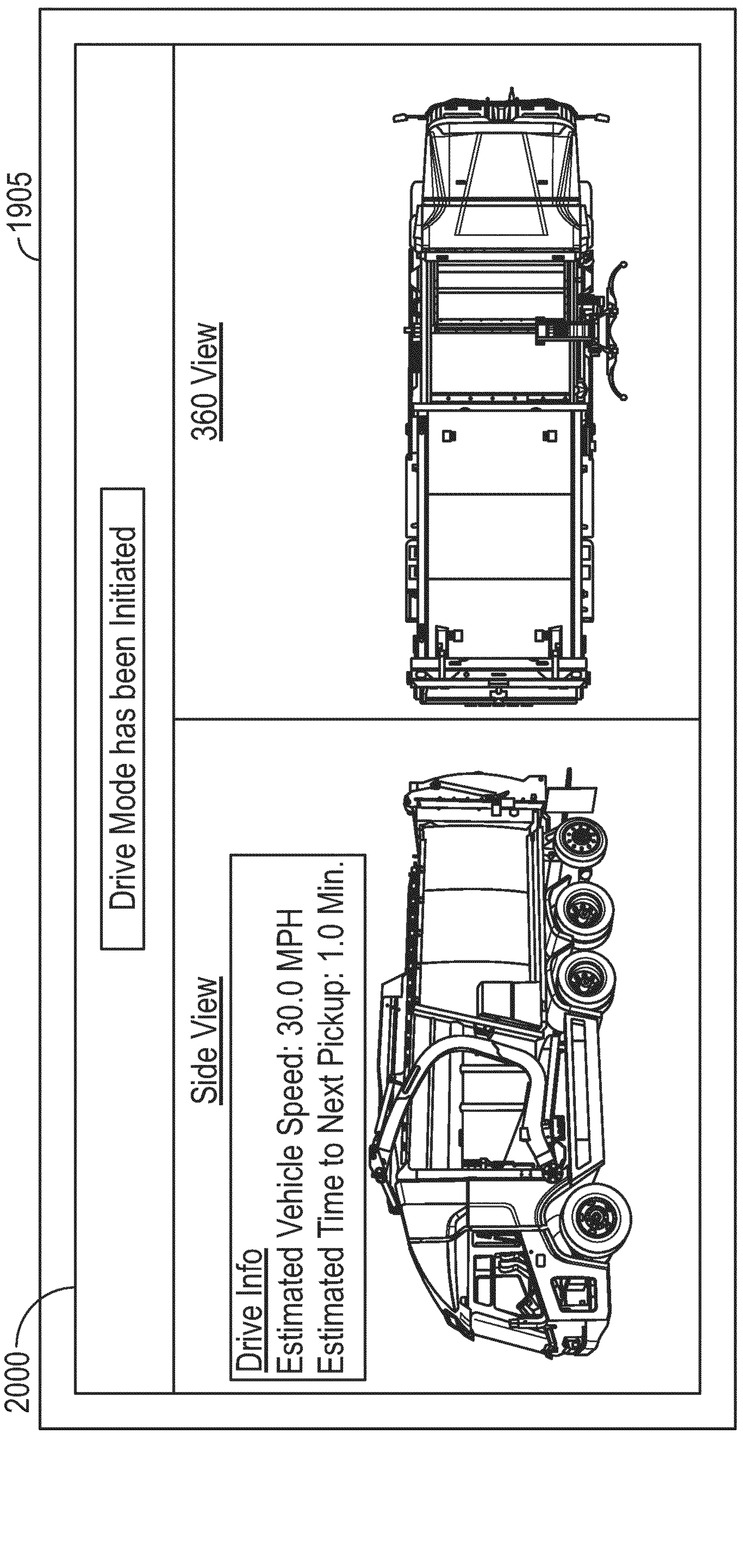
FIG. 20 is a perspective view of a display device including a user interface, according to an exemplary embodiment.

FIG. 20 depicts a perspective view of the display device 1905 including a user interface 2000, according to an exemplary embodiment. The user interface 2000 can be generated by the interface generator 1430. The user interface 2000 can be generated responsive to the mode manager 1420 determining that the vehicle 10 is in drive mode. The information shown in the user interface 2000 can be information generated, provided and/or otherwise created by components in the system 1400. The user interface 2000 can include at least one view of the vehicle 10. For example, the user interface 2000 can include a side view of the vehicle 10 and a 360 view of the vehicle 10. The views can be views that are provided by the sensors 1440. The user interface 2000 can also include a text box that includes the current mode of the vehicle 10. FIG. 20 depicts an example of the text box indicating that drive mode has been initiated. The user interface 2000 can also include a text box that includes drive information. FIG. 20 depicts an example of the drive information including an estimated vehicle speed and an estimated time to next pickup. While FIG. 20 depicts the user interface 2000 including a side view and a 360 view, the user interface 2000 can include at least one of an aerial view, a 360 view, a rear right view, a rear left view, a rear view, a side right view, a side left view, a front right view, a front left view, a front view and/or among other possible views.

Figure 21:
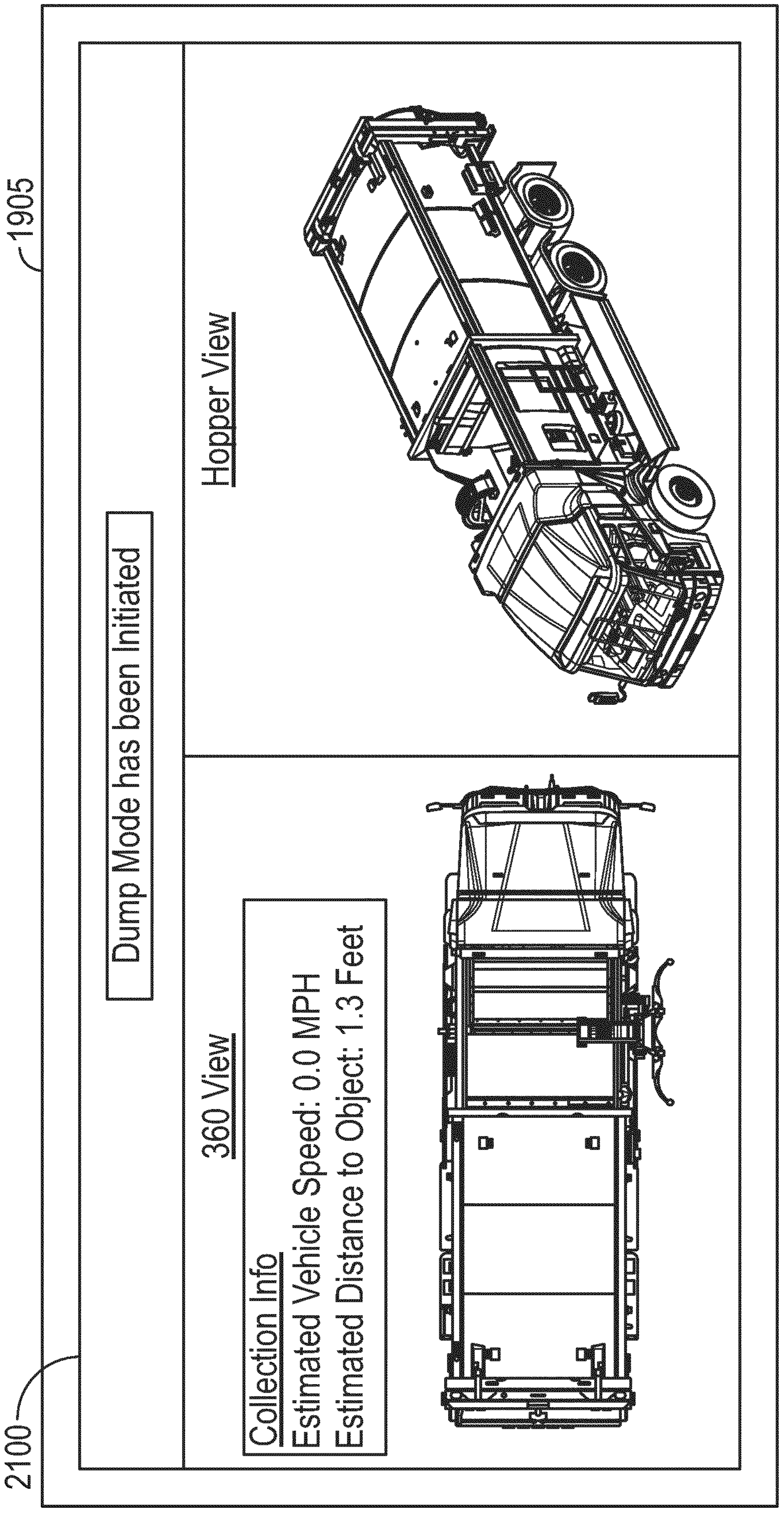
FIG. 21 is a perspective view of a display device including a user interface, according to an exemplary embodiment.

FIG. 21 depicts a perspective view of the display device 1905 including a user interface 2100, according to an exemplary embodiment. The user interface 2100 can be generated by the interface generator 1430. The user interface 2100 can be generated responsive to the mode manager 1420 determining that the vehicle 10 is in dump mode. The information shown in the user interface 2100 can be information generated, provided and/or otherwise created by components in the system 1400. The user interface 2100 can include at least one view of the vehicle 10. For example, the user interface 2100 can include a 360 view of the vehicle 10 and a hopper view of the vehicle 10. The views can be views that are provided by the sensors 1440. The user interface 2100 can also include a text box that includes the current mode of the vehicle 10. FIG. 21 depicts an example of the text box indicating that dump mode has been initiated. The user interface 2100 can also include a text box that includes collection information. FIG. 21 depicts an example of the collection information including an estimated vehicle speed and an estimated distance to an object (e.g., a garbage can). While FIG. 21 depicts the user interface 2100 including a 360 view and a hopper view, the user interface 2100 can include at least one of an aerial view, a 360 view, a rear right view, a rear left view, a rear view, a side right view, a side left view, a front right view, a front left view, a front view and/or among other possible views.

Figure 22:
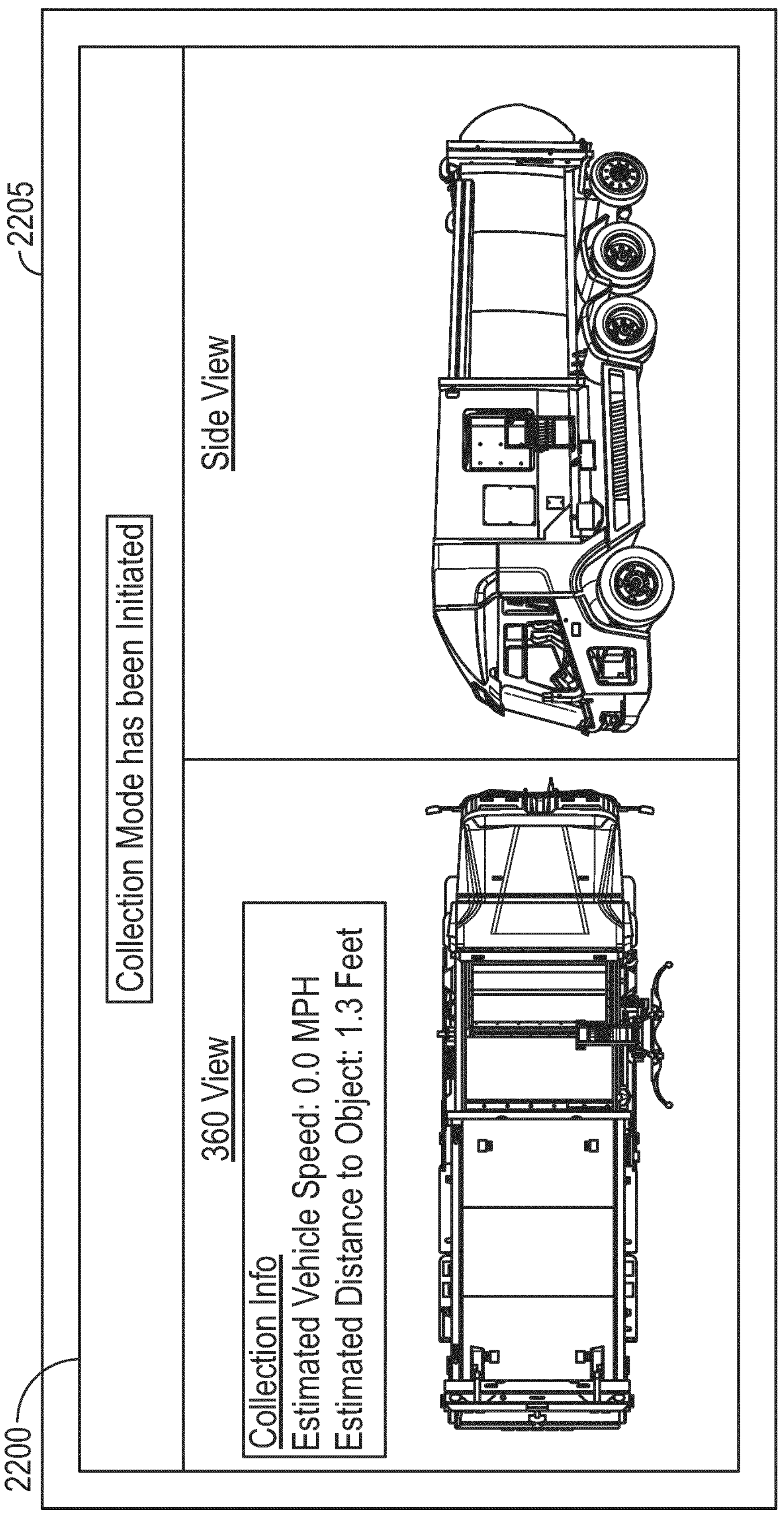
FIG. 22 is a perspective view of a display device including a user interface, according to an exemplary embodiment.

FIG. 22 depicts a perspective view of a display device 2205 including a user interface 2200, according to an exemplary embodiment. The display device 2205 can be the display device 1445. For example, the display device 2205 can be the first display device 1445 (e.g., the instrument cluster display depicted in FIG. 15). The user interface 2200 can be generated by the interface generator 1430. The user interface 2200 can be generated responsive to the mode manager 1420 determining that the vehicle 10 is in collection mode. The information shown in the user interface 2200 can be information generated, provided and/or otherwise created by components in the system 1400. The user interface 2200 can include at least one view of the vehicle 10. For example, the user interface 2200 can include a 360 view of the vehicle 10 and a side view of the vehicle 10. The views can be views that are provided by the sensors 1440. The user interface 2200 can also include a text box that includes the current mode of the vehicle 10. FIG. 22 depicts an example of the text box indicating that collection mode has been initiated. The user interface 2200 can also include a text box that includes collection information. FIG. 22 depicts an example of the collection information including an estimated vehicle speed and an estimated distance to an object (e.g., a garbage can). While FIG. 22 depicts the user interface 22 including a 360 view and a side view, the user interface 2200 can include at least one of an aerial view, a 360 view, a rear right view, a rear left view, a rear view, a side right view, a side left view, a front right view, a front left view, a front view and/or among other possible views.

Figure 23:
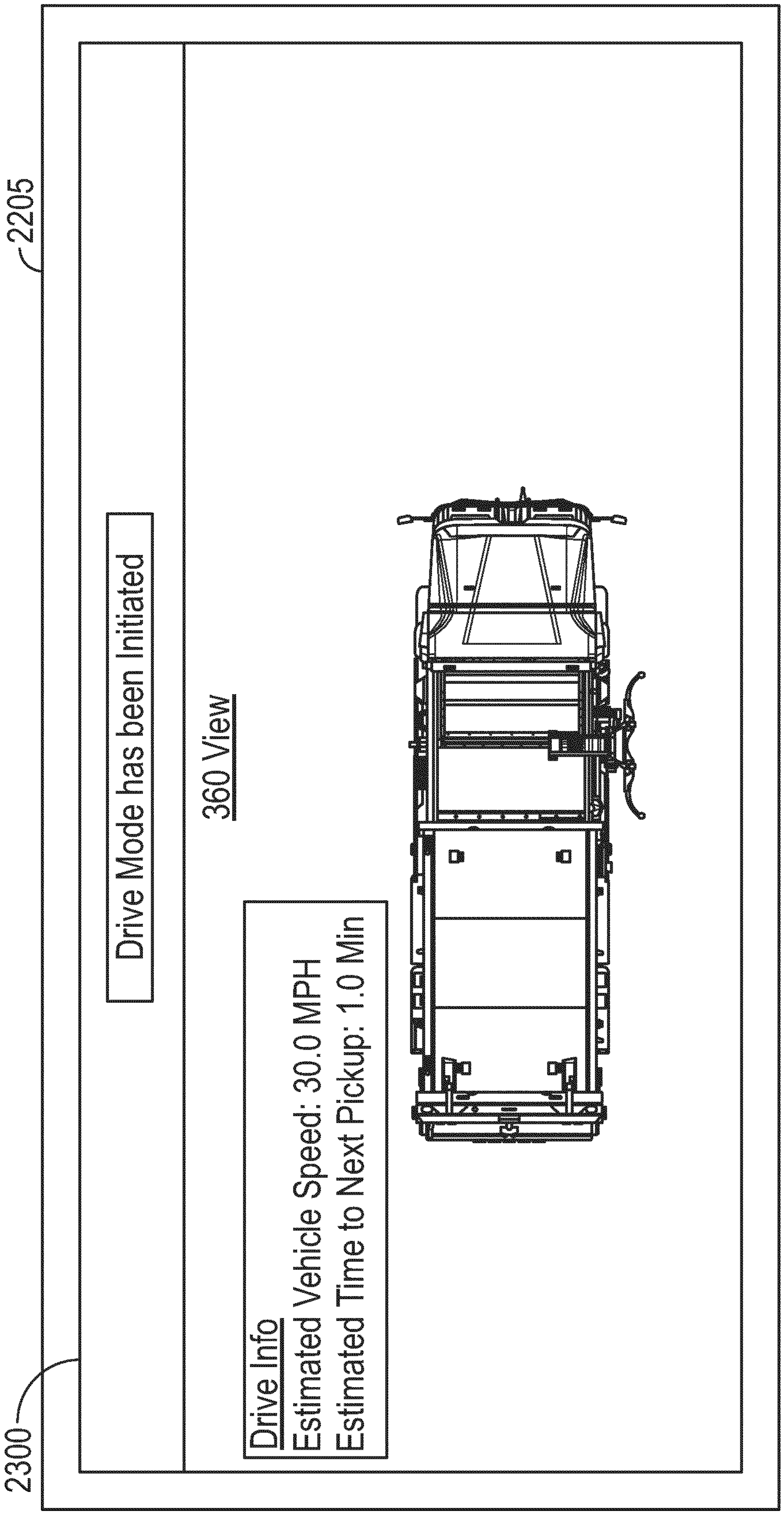
FIG. 23 is a perspective view of a display device including a user interface, according to an exemplary embodiment.

FIG. 23 depicts a perspective view of the display device 2205 including a user interface 2300, according to an exemplary embodiment. The user interface 2300 can be generated by the interface generator 1430. The user interface 2300 can be generated responsive to the mode manager 1420 determining that the vehicle 10 is in drive mode. The information shown in the user interface 2300 can be information generated, provided and/or otherwise created by components in the system 1400. The user interface 2300 can include at least one view of the vehicle 10. For example, the user interface 2300 can include a 360 view of the vehicle 10. The views can be views that are provided by the sensors 1440. The user interface 2300 can also include a text box that includes the current mode of the vehicle 10. FIG. 23 depicts an example of the text box indicating that drive mode has been initiated. The user interface 2300 can also include a text box that includes drive information. FIG. 23 depicts an example of the drive information including an estimated vehicle speed and an estimated time to next pickup. While FIG. 23 depicts the user interface 2300 including a 360 view, the user interface 2300 can include at least one of an aerial view, a 360 view, a rear right view, a rear left view, a rear view, a side right view, a side left view, a front right view, a front left view, a front view and/or among other possible views.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A refuse vehicle, comprising:

a battery configured to power the refuse vehicle;

a display configured to display one or more user interfaces;

a sensor;

an implement;

a door; and a control system including one or more memory devices storing instructions thereon that, when executed by one or more processors, cause the one or more processors to:

determine a state of charge of the battery;

detect that the door has moved from a first position to a second position;

transmit, responsive to detecting that the door has moved from the first position to the second position, a control signal to the display causing the display to display a user interface including the state of charge of the battery, wherein the display displays the user interface for a predetermined amount of time;

receive, from the sensor, a set of operational data associated with the refuse vehicle;

determine, using the set of operational data, that the refuse vehicle is operating in a first mode;

transmit, responsive to determining that the refuse vehicle is operating in the first mode, a second control signal to the display causing the display to update the user interface to include a first view of the refuse vehicle; and transmit, responsive to determining that the refuse vehicle is operating in the first mode, a third control signal to the implement, wherein the third control signal prevents operation of the implement.

2. The refuse vehicle of claim 1, wherein the instructions cause the one or more processors to:

determine that the battery is electrically coupled with a power source; and transmit, responsive to detecting that the battery is electrically coupled with the power source, a fourth control signal to the display causing the display to update the user interface to include an indication that the battery is charging.

3. The refuse vehicle of claim 1, wherein the display is disposed within a center console of the refuse vehicle.

4. The refuse vehicle of claim 1, wherein the user interface further includes:

an indication that the refuse vehicle is electrically coupled with a power source; and a prompt to decouple the refuse vehicle from the power source prior to operation of the refuse vehicle.

5. The refuse vehicle of claim 1, wherein the instructions cause the one or more processors to:

determine that the refuse vehicle is in a first operation status; and transmit, based on the first operation status and responsive to detecting that the door has moved from the first position to the second position, the control signal to the display.

6. The refuse vehicle of claim 1, wherein the instructions cause the one or more processors to:

receive, from the sensor, a second set of operational data associated with the refuse vehicle;

determine, using the second set of operational data, that the refuse vehicle is operating in a second mode; and transmit, responsive to determining that the refuse vehicle is operating in the second mode, a fourth control signal to the display causing the display to update the user interface to include a second view of the refuse vehicle;

wherein the first view of the refuse vehicle and the second view of the refuse vehicle are different.

7. The refuse vehicle of claim 1, wherein the instructions cause the one or more processors to:

determine that the refuse vehicle is operating in a second mode; and transmit, responsive to determining that the refuse vehicle is operating in the second mode, a fourth control signal to the implement, wherein the fourth control signal enables operation of the implement.

8. The refuse vehicle of claim 1, comprising:

an audio device, wherein the instructions cause the one or more processors to:

receive, from the sensor, a set of operational data associated with operation of the refuse vehicle;

determine, using the set of operational data and a predetermined set of operational data, a difference that indicates a deviation in operation of the refuse vehicle; and transmit, responsive to determination of the difference, a fourth control signal to the audio device causing the audio device to produce an audible alert to indication the deviation in the operation of the refuse vehicle.

9. The refuse vehicle of claim 1, comprising:

a climate system configured to control an environmental condition of the refuse vehicle; and a steering wheel including an input device, the input device associated with an aspect of the environmental condition of the refuse vehicle;

wherein the instructions cause the one or more processors to:

detect a first interaction with the input device, the first interaction indicating a value pertaining to the aspect of the environmental condition of the refuse vehicle; and transmit, responsive to detecting the first interaction, a fourth control signal to the climate system causing the climate system to control the environmental condition of the refuse vehicle to reflect the value pertaining to the aspect of the environmental condition of the refuse vehicle.

10. The refuse vehicle of claim 1, wherein the implement is configured to perform an action associated with operation of the refuse vehicle, further comprising:

a steering wheel including an input device, the input device pertaining to an aspect of the action associated with the operation of the refuse vehicle, wherein the instructions cause the one or more processors to:

detect a first interaction with the input device, the first interaction indicating a request to perform the action associated with the operation of the refuse vehicle; and transmit, responsive to detecting the first interaction, a fourth control signal to the implement causing the implement to perform the action associated with the operation of the refuse vehicle.

11. The refuse vehicle of claim 1, comprising:

a brake system; and an input device, configured to:

activate, responsive to a first interaction with the input device, the brake system; and deactivate, responsive to a second interaction with the input device, the brake system.

12. The refuse vehicle of claim 11, wherein the input device is at least one of a button or a switch.

* * * * *